(12) United States Patent
Roy et al.

(10) Patent No.: US 12,008,321 B2
(45) Date of Patent: Jun. 11, 2024

(54) NATURAL LANGUAGE PROCESSING TECHNIQUES FOR SEQUENTIAL TOPIC MODELING

(71) Applicant: Optum Technology, Inc., Eden Prairie, MN (US)

(72) Inventors: Suman Roy, Bangalore (IN); Vijay Varma Malladi, Hyderabad (IN); Ayan Sengupta, Noida (IN); Souparna Das, Murshidabad (IN)

(73) Assignee: Optum Technology, Inc., Eden Prairie, MN (US)

( * ) Notice: Subject to any disclaimer, the term of this patent is extended or adjusted under 35 U.S.C. 154(b) by 786 days.

(21) Appl. No.: 17/101,606

(22) Filed: Nov. 23, 2020

(65) Prior Publication Data
US 2022/0164537 A1    May 26, 2022

(51) Int. Cl.
*G06F 40/30* (2020.01)
*G06F 40/279* (2020.01)
(Continued)

(52) U.S. Cl.
CPC ......... *G06F 40/30* (2020.01); *G06F 40/279* (2020.01); *G06N 5/02* (2013.01); *G06N 5/04* (2013.01); *G06N 20/00* (2019.01)

(58) Field of Classification Search
CPC ....... G06F 40/30; G06F 40/279; G06N 20/00; G06N 5/02; G06N 5/04
See application file for complete search history.

(56) References Cited

U.S. PATENT DOCUMENTS 7,788,264 B2 *  8/2010  Zhu .................. G06F 16/951
                                                    707/739
8,234,274 B2 *  7/2012  Guo .................. G06F 16/94
                                                    707/726
(Continued)

FOREIGN PATENT DOCUMENTS

CN    104199829 A    12/2014
CN    108681557 A    10/2018
(Continued)

OTHER PUBLICATIONS

Yan, Xtaohui et al. "Learning Topics In Short Texts By Non-Negative Matnx Factorization On Term Correlation Matrix," In Proceedings of the 2013 Society for Industrial and Applied Mathematics International Conference on Data Mining SIAM, May 2, 2013, pp. 749-757. (Year: 2013).*

(Continued)

*Primary Examiner* — Shahid K Khan
(74) *Attorney, Agent, or Firm* — ALSTON & BIRD LLP

(57) ABSTRACT

There is a need for more effective and efficient predictive natural language topic detection. This need can be addressed by, for example, solutions for performing sequential topic detection. In one example, a method includes determining a sequential topic distribution data object for the current document sequence, determining a current term-context correlation data object for the current document sequence, determining a current context-topic correlation data object for the current document sequence, determining an updated term-topic correlation data object based at least in part on the current context-topic correlation data object, determining topic modeling predictions based at least in part on the sequential topic distribution data object and the updated term-topic correlation data object, and performing predic- (Continued)

tion-based actions based at least in part on the topic modeling predictions.

20 Claims, 8 Drawing Sheets

(51) Int. Cl.
*G06N 5/02* (2023.01)
*G06N 5/04* (2023.01)
*G06N 20/00* (2019.01)

(56) References Cited

U.S. PATENT DOCUMENTS

| | | | | |
|---|---|---|---|---|
| 8,356,086 B2* | 1/2013 | Liu | ............... | G06F 17/16 |
| | | | | 709/212 |
| 8,515,879 B2* | 8/2013 | Huh | ............... | G06F 17/16 |
| | | | | 708/207 |
| 8,682,649 B2* | 3/2014 | Bellegarda | ............... | G10L 13/10 |
| | | | | 704/10 |
| 8,719,302 B2* | 5/2014 | Bailey | ............... | H04L 51/52 |
| | | | | 707/790 |
| 9,424,299 B2 | 8/2016 | Bufe et al. | | |
| 9,501,525 B2 | 11/2016 | Barker et al. | | |
| 10,007,716 B2 | 6/2018 | Tee | | |
| 10,013,480 B2 | 7/2018 | Aiello et al. | | |
| 10,037,320 B2* | 7/2018 | Amin | ............... | G06F 40/166 |
| 10,055,479 B2* | 8/2018 | Clinchant | ............... | G06F 16/353 |
| 10,083,176 B1 | 9/2018 | Desai et al. | | |
| 10,216,724 B2 | 2/2019 | Sinha et al. | | |
| 11,163,963 B2* | 11/2021 | Kumar | ............... | G06F 40/30 |
| 11,650,986 B1* | 5/2023 | Agbemabiese | ... | G06F 16/24553 |
| | | | | 707/737 |
| 2009/0132901 A1* | 5/2009 | Zhu | ............... | G06F 16/951 |
| | | | | 715/206 |
| 2014/0280361 A1 | 9/2014 | Aliferis et al. | | |
| 2015/0052098 A1* | 2/2015 | Kveton | ............... | G06Q 50/01 |
| | | | | 706/52 |
| 2015/0378986 A1* | 12/2015 | Amin | ............... | G06F 40/30 |
| | | | | 704/9 |
| 2016/0180219 A1* | 6/2016 | Clark | ............... | G06N 5/022 |
| | | | | 706/46 |
| 2016/0203209 A1* | 7/2016 | Clinchant | ............... | G06F 16/353 |
| | | | | 707/738 |
| 2017/0046601 A1 | 2/2017 | Chang et al. | | |
| 2017/0116204 A1 | 4/2017 | Davaleu et al. | | |
| 2018/0165554 A1 | 6/2018 | Zhang et al. | | |
| 2018/0225372 A1 | 8/2018 | Lecue et al. | | |
| 2018/0357302 A1 | 12/2018 | Qi et al. | | |
| 2019/0324606 A1* | 10/2019 | Kveton | ............... | G06F 3/0483 |

FOREIGN PATENT DOCUMENTS

| | | | | |
|---|---|---|---|---|
| CN | 110390014 A | 10/2019 | | |
| CN | 112183108 A * | 1/2021 | ............ | G06F 16/36 |
| DE | 102009037848 A1 * | 11/2010 | ............ | G06N 7/005 |
| WO | WO-2015042819 A1 * | 4/2015 | ............ | G06F 17/24 |

OTHER PUBLICATIONS

Shi, Tian et al. "Short-Text Topic Modeling Via Non-Negative Matrix Factorization Enriched With Local Word-Context Correlations," In Proceedings of the 2018 World Wide Web Conference, Apr. 10, 2018, pp. 1105-1114. (Year: 2018).*
Kim, Jingu et al. "Algorithms For Non-Negative Matrix and Tensor Factorizations: A Unified View Based On Block Coordinate Descent Framework," Journal of Global Optimization, No. 58, No. 2, (2014), pp. 285-319. (Year: 2014).*
Choo, Jaegul et al. "Utopian: User-Driven Topic Modeling Based On Interactive Nonnegative Matrix Factorization." IEEE Transactions On Visualization and Computer Graphics, vol. 19, No. 12, Dec. 13, pp. 1992-2001. (Year: 2013).*
Bucak, Serhat S. et al. "Incremental Subspace Learning Via Non-Negative Matrix Factorization," Pattern Recognition, vol. 42, Issue 5, (2009), pp. 788-797. ISSN 0031-3203. (Year: 2009).*
Qiang, Jipeng et al. "Topic Modeling Over Short Texts By Incorporating Word Embeddings," Sep. 27, 2016, (10 pages). (Year: 2016).*
Quan, Xiaojun et al. "Short and Sparse Text Topic Modeling Via Self-Aggregation, " In Proceedings of the 24th International Conference on Artificial Intelligence, ISCAI 2015, AAAI Press (2015), 2270-2276. (Year: 2015).*
Cao, Bin et al. "Detect and Track Latent Factors with Online Nonnegative Matrix Factorization," In Proceedings of IJCAI, vol. 7, Jan. 6, 2007, pp. 2689-2694. (Year: 2007).*
Gadelrab, Fatma S. et al. "Novel Semantic Tagging Detection Algorithms Based Non-Negative Matrix Factorization," SN Applied Sciences, vol. 2, No. 54 (2020), pp. 1-18, published online: Dec. 9, 2019, Switzerland. (Year: 2019).*
"Deeply Moving: Deep Learning For Sentiment Analysis," (6 pages), [article], [online], [Retrieved from the Internet Dec. 18, 2019] <https://nlp.stanford.edu/sentiment/>.
"Sentiment Analysis," General Architecture For Text Engineering, (2 pages), [article], [online], [Retrieved from the Internet Dec. 18, 2019] <https://gate.ac.uk/applications/sentiment.html>.
"Sentiment Analysis," OpenText, (6 pages), [article], [online], [Retrieved from the Internet Dec. 18, 2019] <https://www.opentext.com/products-and-solutions/products/discovery/information-access-platform/sentiment-analysis>.
"sklearn.decomposition.LatentDirichletAllocation," (5 pages). [Online]. [Retrieved from the Internet Jan. 1, 2021] <https://scikit-learn.org/stable/modules/generated/sklearn.decomposition.LatentDirichletAllocation.html>.
"Tone Analyzer," IBM Watson, (10 pages), [online], [Retrieved from the Internet Dec. 19, 2019] <https://www.ibm.com/watson/services/tone-analyzer/>.
"Topic Modelling For Humans," GENSIM, (6 pages), [online]. [Retrieved from the Internet Dec. 30, 2020] <https://radimrehurek.com/gensim/>.
Alshari, Eissa et al. "Improvement Of Sentiment Analysis Based On Clustering of Word2Vec Features," In 28th International Workshop on Database and Expert Systems Applications (DEXA), Aug. 29, 2017, pp. 123-126. IEEE.
Alsumait, Loulwah et al. "On-line LDA: Adaptive Topic Models For Mining Text Streams With Applications To Topic Detection and Tracking," In 2008 Eighth IEEE International Conference On Data Mining, Dec. 15, 2008, (pp. 3-12). IEEE.
Arbelaitz, Olatz et al. "An Extensive Comparative Study of Cluster Validity Indices," Pattern Recognition, vol. 46, No. 1, (2013), pp. 243-256.
Bagheri, Ayoub et al. "ADM-LDA: An Aspect Detection Model Based On Topic Modelling Using The Structure Of Review Sentences," Journal of Information Science 2014, vol. 40, Issue 5, pp. 621-636.
Blei, David M. et al. "Dynamic Topic models," In Proceedings of the 23rd International Conference On Machine Learning, Jun. 25, 2006. pp. 113-120.
Blei, David M. et al. "Latent Dirichlet Allocation," Journal of Machine Learning Research, vol. 3, (2003), pp. 993-1022.
Bottou, Leon. "Stochastic Learning," In O. Bousquet et al. (EDS) Advanced Lectures on Machine Learning 2003. Lecture Notes in Computer Science, vol. 3176, (2004), pp. 146-168. Springer, Berlin, Heidelberg. DOI:10.1007/978-3-540-28650-9_7.
Boyd-Graber, Jordan et al. "Holistic Sentiment Analysis Across Languages: Multilingual Supervised Latent Dirichlet Allocation," Proceedings of the 2010 Conference On Empirical Methods In Natural Language Processing, Oct. 9, 2010, pp. 45-55.
Bucak, Serhat S. et al. "Incremental Subspace Learning Via Non-Negative Matrix Factorization," Pattern Recognition, vol. 42, Issue 5, (2009), pp. 788-797. ISSN 0031-3203. DOI: 10.1016/j.patcog.2008.09.002.
Cao, Bin et al. "Detect and Track Latent Factors with Online Nonnegative Matrix Factorization," In Proceedings of IJCAI, vol. 7, Jan. 6, 2007, pp. 2689-2694.

(56) References Cited

OTHER PUBLICATIONS

Chen, Guan-Bin et al. "Word Co-Occurrence Augmented Topic Model In Short Text," Computational Linguistics and Chinese Language Processing, vol. 20, No. 2, Dec. 2015, pp. 45-64.
Choo, Jaegul et al. "Utopian: User-Driven Topic Modeling Based On Interactive Nonnegative Matrix Factorization." IEEE Transactions On Visualization and Computer Graphics, vol. 19, No. 12, Dec. 13, pp. 1992-2001.
Ding, Chris et al. "Orthogonal Non-Negative Matrix Tri-Factorizations For Clustering," In Proceedings of the Twelfth ACM SIGKDD International Conference on Knowledge Discovery and Data Mining, Aug. 20, 2006, pp. 126-135.
Griffiths, Griffiths and M. Steyvers. Finding scientific topics. Proceedings of the National Academy of Sciences, Apr. 6, 2004, vol. 101, Suppl. 1, pp. 5228-5235.
Guan, Naiyang et al. "Online Nonnegative Matrix Factorization With Robust Stochastic Approximation," IEEE TransACTIONS On Neural Networks and Learning Systems, vol. 23, No. 7, Jul. 2012, pp. 1087-1099.
Hb, Barathi Ganesh et al. "Distributional Semantic Representation In Health Care Text Classification," 2016, (4 pages).
He, Zhaoshui et al. "Symmetric Nonnegative Matrix Factorization: Algorithms and Applications To Probabilistic Clustering." IEEE Transactions On Neural Networks, vol. 22, No. 12, Dec. 2011, pp. 2117-2131.
Hoffman, Matthew D. et al. "Online Learning For Latent Dirichlet Allocation," In: Advances in Neural Information Processing Systems, vol. 23, (9 pages), 24th Annual Conference on Neural Information Processing Systems, Proceedings of A Meeting Held Dec. 6-9, 2010.
Hofmann, Thomas. "Probabilistic Latent Semantic Indexing," In SIGIR Forum, (1999), pp. 50-57, ACM.
Hu, Xia et al. "Unsupervised Sentiment Analysis With Emotional Signals," In Proceedings of the 22nd International Conference on World Wide Web May 13, 2013, pp. 607-618. ACM.
Iwata, Tomoharu et al. "Online Multiscale Dynamic Topic Models," In Proceedings of the 16th ACM SIGKDD International Conference on Knowledge Discovery and Data Mining, (2010), (10 pages).
Keiningham, Timothy L. et al. "A Longitudinal Examination Of Net Promoter and Firm Revenue Growth," Journal of Marketing, vol. 71, No. 3, Jul. 2007, pp. 39-51.
Kim, Hyunsoo et al. "Non-Negative Matrix Factorization Based On Alternating Non-Negativity Constrained Least Squares and Active Set Method," SIAM Journal On Matrix Analysis and Applications, vol. 30, No. 2, (2008), (16 pages).
Kim, Jingu et al. "Algorithms For Non-Negative Matrix and Tensor Factorizations: A Unified View Based On Block Coordinate Descent Framework," Journal of Global Optimization, No. 58, No. 2, (2014), pp. 285-319. DOI: 10.1007/s10898-013-0035-4.
Kim, Jingu et al. "Fast Non-Negative Matrix Factorization: An Active-Set-Like Method and Comparisons, " SIAM Journal on Scientific Computing, vol. 33, No. 6, (2011), (21 pages).
Kim, Soo-Min et al. "Determining The Sentiment Of Opinions," In Proceedings of the 20th International Conference on Computational Linguistics Aug. 23, 2004, (7 pages), Association for Computational Linguistics.
Kuang, Da et al. "Nonnegative Matrix Factorization for Interactive Topic Modeling and Document Clustering," Springer International Publishing Switzerland 2015, pp. 215-243. DOI: 10.1007/978-3-319-09259-1_7.
Lee, Daniel D. et al. "Algorithms For Non-Negative Matrix Factorization," In Advances In Neural Information Processing Systems 13, pp. 556-562, MIT Press, 2001. T.K. Leen, T.G. Dietterick, and V. Tresp, Editors.
Leskovec, Jure et al. "Mining of Massive Datasets," 2nd Edition, Tanagra Data Mining, Cambridge University Press (2014), pp. '1-16.
Li, Chenliang et al. "Topic Modeling For Short Texts With Auxiliary Word Embedding," In Proceedings of the 39th International ACM SIGIR Conference On Research and Development In Information Retrieval, Jul. 7, 2016, pp. 165-174.
Li, Tao et al. "A Non-Negative Matrix Tri-Factorization Approach To Sentiment Classification With Lexical Prior Knowledge." In Proceedings of the 47th Annual Meeting of the ACL and the 4th International Joint Conference On Natural Language Processing of the AFNLP, pp. 244-252, Aug. 2, 2009, Suntec, Singapore.
Li, Tao et al. "Knowledge Transformation From Word Space To Document Space," In Proceedings of the 31st Annual International ACM SIGIR'08, pp. 187-194, Jul. 20, 2008, Singapore.
Lin, Chenghua et al. "Joint Sentiment Topic Model For Sentiment Analysis," In Proceedings of the 18th ACM Conference on Information and Knowledge Management, CIKM '09, pp. 375-384, Nov. 2, 2009. ACM.
Lin, Chih-Jen. "Projected Gradient Methods For Non-Negative Matrix Factorization," Neural Computation, vol. 19, No. 10, Oct. 2007, (27 pages).
Liu, Bing et al. "Opinion Observer: Analyzing and Comparing Opinions On The Web," In Proceedings of the 14th International Conference on World Wide Web, WWW'05, pp. 342-351, May 10, 2005, Chiba, Japan.
Mei, Qiaozhu et al. "Automatic Labeling of Multinomial Topic Models," In Proceedings of the 13th ACM SIGKDD International Conference on Knowledge Discovery and Data Mining, pp. 490-499, Aug. 12, 2007, San Jose, California.
Mei, Qiaozhu et al. "Topic Sentiment Mixture: Modeling Facets and Opinions In Weblogs," In Proceedings of the 16th International Conference on World Wide Web, WWW'07, pp. 171-180, May 8, 2007, Banff, Alberta, Canada.
Mikolov, Tomas et al. "Efficient Estimation Of Word Representations In Vector Space," pp. 1-12, arXiv: 1301.3781v3 [cs.CL], Sep. 7, 2013.
Nugroho, Robertus et al. "Deriving Topics In Twitter By Exploiting Tweet Interactions," In 2015 IEEE International Congress on Big Data, Jun. 27-Jul. 2, 2015, pp. 87-94. New York City, NY, USA. DOI: 10.1109/BigDataCongress.2015.22.
O'Hare, Neil et al. "Topic-Dependent Sentiment Analysis Of Financial Blogs," In Proceedings of the 1st International CIKM Workshop On Topic-Sentiment Analysis For Mass Opinion Measurement, Nov. 6, 2009, pp. 9-16, Hong Kong, China. ACM.
Pang, Bo et al. "Opinion Mining and Sentiment Analysis," Foundations and Trends In Information Retrieval, vol. 2, No. 1-2, pp. 1-135, (2008).
Pang, Bo et al. "Thumbs Up? Sentiment Classification Using Machine Learning Techniques," In Proceedings of the 2002 Conference on Empirical Methods in Natural Language Processing (EMNLP), arXiv:cs/0205070v1 [cs.CL], May 28, 2002.
Poddar, Lahari et al. "Author-Aware Aspect Topic Sentiment Model To Retrieve Supporting Opinions From Reviews," In Proceedings of the 2017 Conference on Empirical Methods in Natural Language Processing, EMNLP'17, pp. 472-481, Sep. 7, 2017, Copenhagen, Denmark.
Qiang, Jipeng et al. "Topic Modeling Over Short Texts By Incorporating Word Embeddings," arXiv: 1609.08496v1 [cs.CL] Sep. 27, 2016, (10 pages). DOI: 10.1145/1235. ACM ISBN: 978-1-4503-2138-9.
Lau, Jey Han et al. "Automatic Labelling of Topic Models," Proceedings of the 49th Annual Meeting of the Association for Computational Linguistics, pp. 1536-1545, Jun. 19-24, 2011.
Quan, Xiaojun et al. "Short and Sparse Text Topic Modeling Via Self-Aggregation," In Proceedings of the 24th International Conference on Artificial Intelligence, IJCAI 2015, AAAI Press (2015), 2270-2276.
Rahman, Md Mustafizur et al. "Hidden Topic Sentiment Model," In Proceedings of the 25th International Conference on World Wide Web, WWW '16, pp. 155-165, Apr. 11, 2016, Montreal, Quebec, Canada.
Röder, Michael et al. "Exploring The Space Of Topic Coherence Measures," In Proceedings of the Eighth ACM International Conference on Web Search and Data Mining, WSDM 2015, ACM (2015), pp. 399-408.
Roy, Suman et al. "A NMF-Based Learning Of Topics and Clusters for IT Maintenance Tickets Aided By Heuristic," In Information

(56) References Cited

OTHER PUBLICATIONS

Systems in the Big Data Era—CAiSE Forum 2018, Proceedings, (2018), LNBIP 317, pp. 209-217. DOI: 10.1007/978-3-319-92901-9_18.

Sasaki, Kentaro et al. "Online Topic Model For Twitter Considering Dynamics Of User Interests and Topic Trends," In Proceedings of the 2014 Conference On Empirical Methods In Natural Language Processing (EMNLP), Oct. 2014, pp. 1977-1985.

Shi, Tian et al. "Short-Text Topic Modeling Via Non-Negative Matrix Factorization Enriched With Local Word-Context Correlations," In Proceedings of the 2018 World Wide Web Conference, Apr. 10, 2018, pp. 1105-1114.

Tibshirani, Robert, "Regression Shrinkage And Selection Via The Lasso," Journal of the Royal Statistical Society, Series B (Methodological), vol. 58, Issue 1, (1996), pp. 267-288.

Titov, Ivan et al. "A Joint Model of Text and Aspect Ratings For Sentiment Summarization," In Proceedings of ACL-08: HLT, pp. 308-316, Jun. 2008, Association For Computational Linguistics.

Turney, Peter D. "Thumbs Up Or Thumbs Down? Semantic Orientation Applied To Unsupervised Classification Of Reviews," In Proceedings of the 40th Annual Meeting of the Association for Computational Linguistics (ACL)'04, pp. 417-424, Jul. 6, 2002.

Waggoner, Alexander A. "Triple Non-Negative Matrix Factorization Technique For Sentiment Analysis and Topic Modeling," (2017), CMC Senior Theses. 1550, Claremont McKenna College, (25 pages). [Retrieved from the Internet Dec. 18, 2019] <https://scholarship.claremont.edu/cmc_theses/1550/>.

Wang, Fei et al. "Efficient Document Clustering Via Online Non-negative Matrix Factorizations," In Eleventh SIAM International Conference on Data Mining, Society for Industrial and Applied Mathematics, (SDM), (2011), pp. 908-919.

Wang, Fei et al. "Efficient Nonnegative Matrix Factorization With Random Projections," In Proceedings of the 2010 Society for Industrial and Applied Mathematics (SIAM) International Conference on Data Mining, Apr. 29, 2010, pp. 281-292.

Wang, Fei et al. "Two Heads Better Than One: Metric+Active Learning And Its Applications For IT Service Classification," The Ninth IEEE International Conference On Data Mining, (2009), pp. 1022-1027.

Wang, Xuerui et al. "Topics Over Time: A Non-Markov Continuous-Time Model Of Topical Trends," In Proceedings of the 12th ACM SIGKDD International Conference On Knowledge Discovery and Data Mining, Aug. 20, 2006, pp. 424-433.

Xu, Wei et al. "Document Clustering Based On Non-Negative Matrix Factorization," In Proceedings of the 26th Annual International ACM SIGIR Conference on Research and Development in Information Retrieval, SIGIR '03, pp. 267-273, Jul. 28, 2003. ACM.

Xun, Guangxu et al. "Topic Discovery For Short Texts Using Word Embeddings," In IEEE 16th International Conference on Data Mining, ICDM'16, (2016), pp. 1299-1304. DOI: 10.1109/ICDM.2016.33.

Yan, Xiaohui et al. "Learning Topics In Short Texts By Non-Negative Matrix Factorization On Term Correlation Matrix," In Proceedings of the 2013 Society for Industrial and Applied Mathematics International Conference on Data Mining SIAM, May 2, 2013, pp. 749-757. [Retrieved from the Internet Jan. 1, 2021] <https://pdfs.semanticscholar.org/b5d0/36429877568a648389531e323ea0983a5148.pdf?ga=2.157248957.700061297.1609543144-615072438.1609543144>.

Zhao, Jun et al. "Adding Redundant Features For CRFs-Based Sentence Sentiment Classification," In Proceedings of the 2008 Conference on Empirical Methods in Natural Language Processing, EMNLP '08, pp. 117-126, Oct. 2008, Association for Computational Linguistics, Honolulu, Hawaii.

Zhou, Guoxu et al. "Online Blind Source Separation Using Incremental Non-Negative Matrix Factorization With Volume Constraint," IEEE Transactions On Neural Networks, Apr. 2011, vol. 22, No. 4, pp. 550-560.

Zuo Yuan et al. "Topic Modeling Of Short Texts: A Pseudo-Document View," In Proceedings of the 22nd ACM SIGKDD International Conference On Knowledge Discovery and Data Mining, Aug. 13, 2016, pp. 2105-2114.

Supplemental Notice of Allowability for U.S. Appl. No. 16/585,201, dated Nov. 24, 2021, (9 pages), United States Patent and Trademark Office, USA.

"DEMO: Online Latent Dirichelt Allocation," (Article, Online), (1 page). [Retrieved online Jun. 10, 2021] <https://www.logos.t.u-tokyo.ac.jp/~eriguchi/demo/olda/>.

Canini, Kevin R. et al. "Online Inference of Topics With Latent Dirichlet Allocation," In Artificial Intelligence and Statistics, Apr. 15, 2009, pp. 65-72, Proceedings of Machine Learning Research.

Flinchbaugh, Anne et al. "ReelTalk: An Interactive Sentiment Analysis Application," Silo.Tips, Apr. 17, 2018, (6 pages). https://silo.tips/download/reeltalk-an-interactive-sentiment-analysis-application#.

Gadelrab, Fatma S. et al. "Novel Semantic Tagging Detection Algorithms Based Non-Negative Matrix Factorization," SN Applied Sciences, vol. 2, No. 54 (2020), pp. 1-18, published online: Dec. 9, 2019, Switzerland. https://doi.org/10.1007/s42452-019-1836-y.

Hu, Yuening et al. "Interactive Topic Modeling," Machine Learning, Jun. 1, 2014, vol. 95, No. 3, pp. 423-469.

Suh, Sangho et al. "Localized User-Driven Topic Discovery Via Boosted Ensemble Of Nonnegative Matrix Factorization," Knowledge and Information Systems, vol. 56, No. 3, (29 pages), Sep. 2018, published online: Jan. 8, 2018. DOI: 10.1007/s10115-017-1147-9.

Notice of Allowance and Fee(s) Due for U.S. Appl. No. 16/585,201, dated Oct. 15, 2021, (28 pages), United States Patent and Trademark Office, USA.

\* cited by examiner

FIG. 7

NATURAL LANGUAGE PROCESSING TECHNIQUES FOR SEQUENTIAL TOPIC MODELING

BACKGROUND

Various embodiments of the present invention address technical challenges related to performing topic modeling, such as topic modeling of short texts. Various embodiments of the present invention address the shortcomings of topic modeling systems and disclose various techniques for efficiently and reliably performing topic modeling using sequential topic discovery.

BRIEF SUMMARY

In general, embodiments of the present invention provide methods, apparatus, systems, computing devices, computing entities, and/or the like for performing sequential topic modeling. Certain embodiments of the present invention utilize systems, methods, and computer program products that perform sequential topic modeling by using at least one of sequential term distribution data objects, sequential topic distribution data objects, prior term-topic correlation data objects, sequential context distribution data objects, current term-context correlation data objects, current context-topic correlation data objects, updated term-topic correlation data objects, document-topic correlation data objects, and term-topic correlation data objects.

In accordance with one aspect, a method is provided. In one embodiment, the method comprises: determining, using one or more processors and based on a sequential term distribution data object for a current document sequence and a prior term-topic correlation data object, a sequential topic distribution data object for the current document sequence; determining, using the one or more processors and based on a sequential context distribution data object for the current document sequence, a current term-context correlation data object for the current document sequence; determining, using the one or more processors and based on the current term-context correlation data object for the current document sequence, a current context-topic correlation data object for the current document sequence; determining, using the one or more processors and based on the sequential topic distribution data object and the current context-topic correlation data object, an updated term-topic correlation data object; determining, using the one or more processors, one or more topic modeling predictions for the current document sequence based on the sequential topic distribution data object and the updated term-topic correlation data object; and performing, using the one or more processors, one or more prediction-based actions based on the one or more topic modeling predictions.

In accordance with another aspect, a computer program product is provided. The computer program product may comprise at least one computer-readable storage medium having computer-readable program code portions stored therein, the computer-readable program code portions comprising executable portions configured to: determine, based on a sequential term distribution data object for a current document sequence and a prior term-topic correlation data object, a sequential topic distribution data object for the current document sequence; determine, based on a sequential context distribution data object for the current document sequence, a current term-context correlation data object for the current document sequence; determine, based on the current term-context correlation data object for the current document sequence, a current context-topic correlation data object for the current document sequence; determine, based on the sequential topic distribution data object and the current context-topic correlation data object, an updated term-topic correlation data object; determine one or more topic modeling predictions for the current document sequence based on the sequential topic distribution data object and the updated term-topic correlation data object; and perform one or more prediction-based actions based on the one or more topic modeling predictions.

In accordance with yet another aspect, an apparatus comprising at least one processor and at least one memory including computer program code is provided. In one embodiment, the at least one memory and the computer program code may be configured to, with the processor, cause the apparatus to: determine, based on a sequential term distribution data object for a current document sequence and a prior term-topic correlation data object, a sequential topic distribution data object for the current document sequence; determine, based on a sequential context distribution data object for the current document sequence, a current term-context correlation data object for the current document sequence; determine, based on the current term-context correlation data object for the current document sequence, a current context-topic correlation data object for the current document sequence; determine, based on the sequential topic distribution data object and the current context-topic correlation data object, an updated term-topic correlation data object; determine one or more topic modeling predictions for the current document sequence based on the sequential topic distribution data object and the updated term-topic correlation data object; and perform one or more prediction-based actions based on the one or more topic modeling predictions.

BRIEF DESCRIPTION OF THE DRAWINGS

Figure 1:
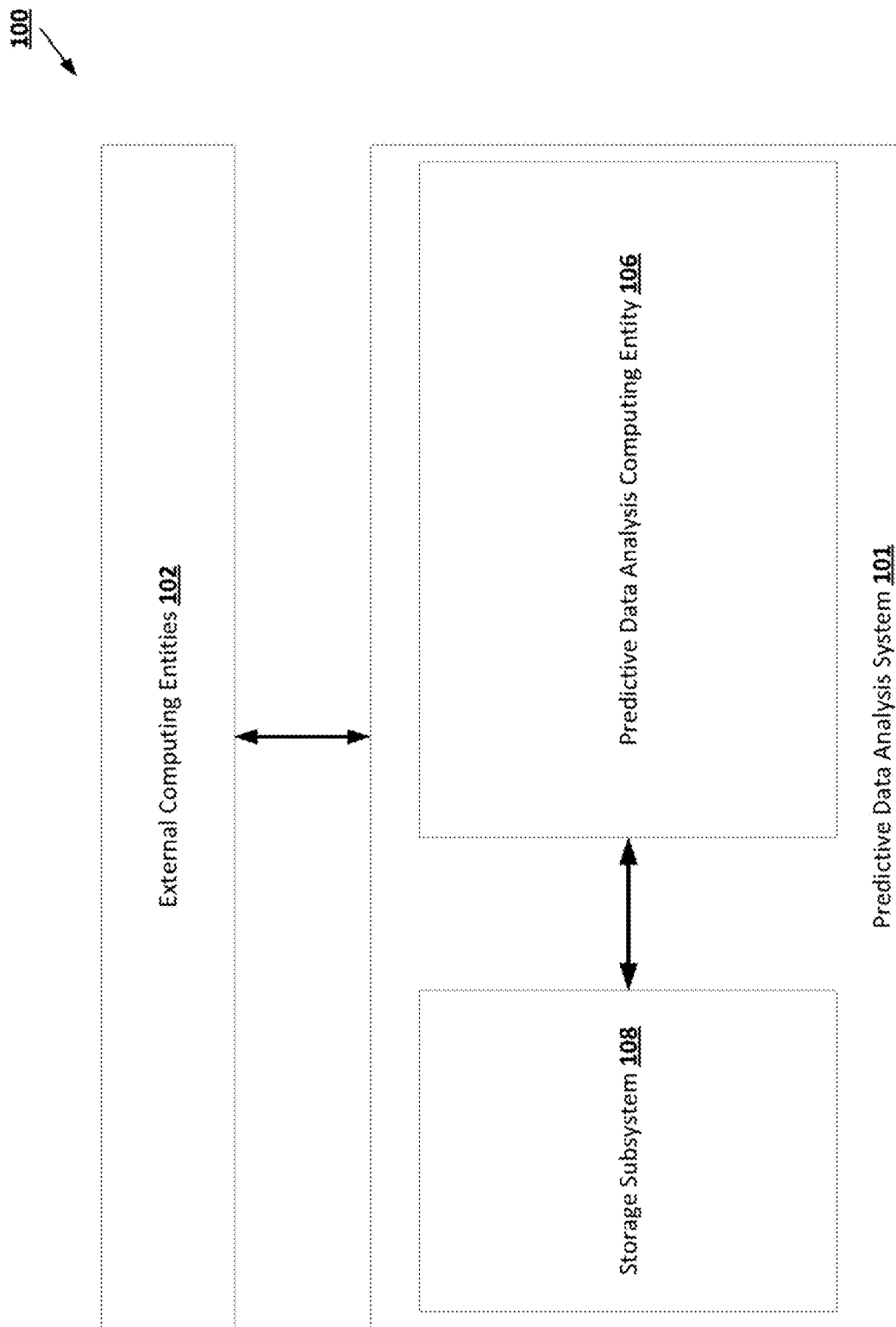

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
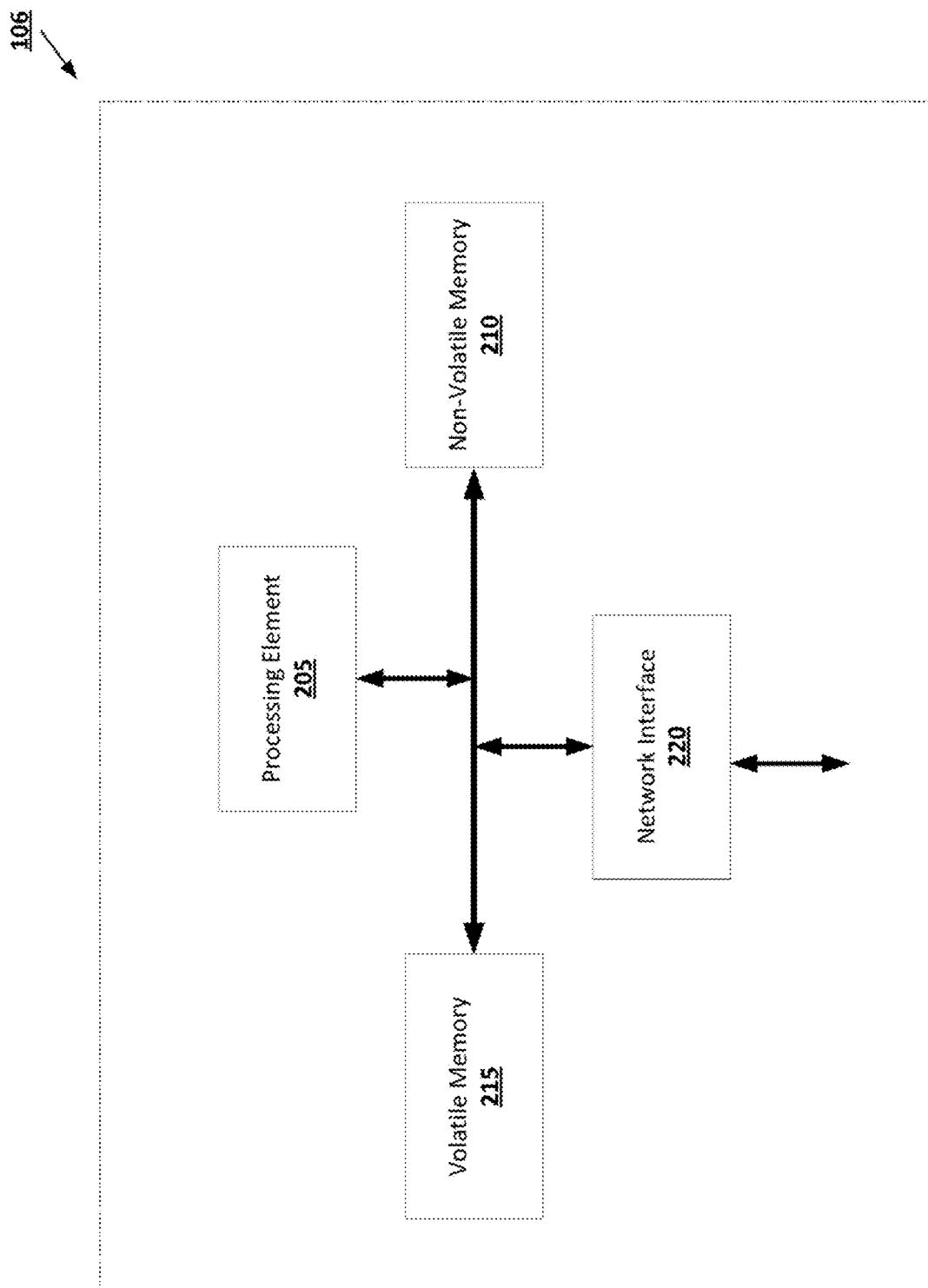

FIG. 2 provides an example predictive data analysis computing entity in accordance with some embodiments discussed herein.

Figure 3:
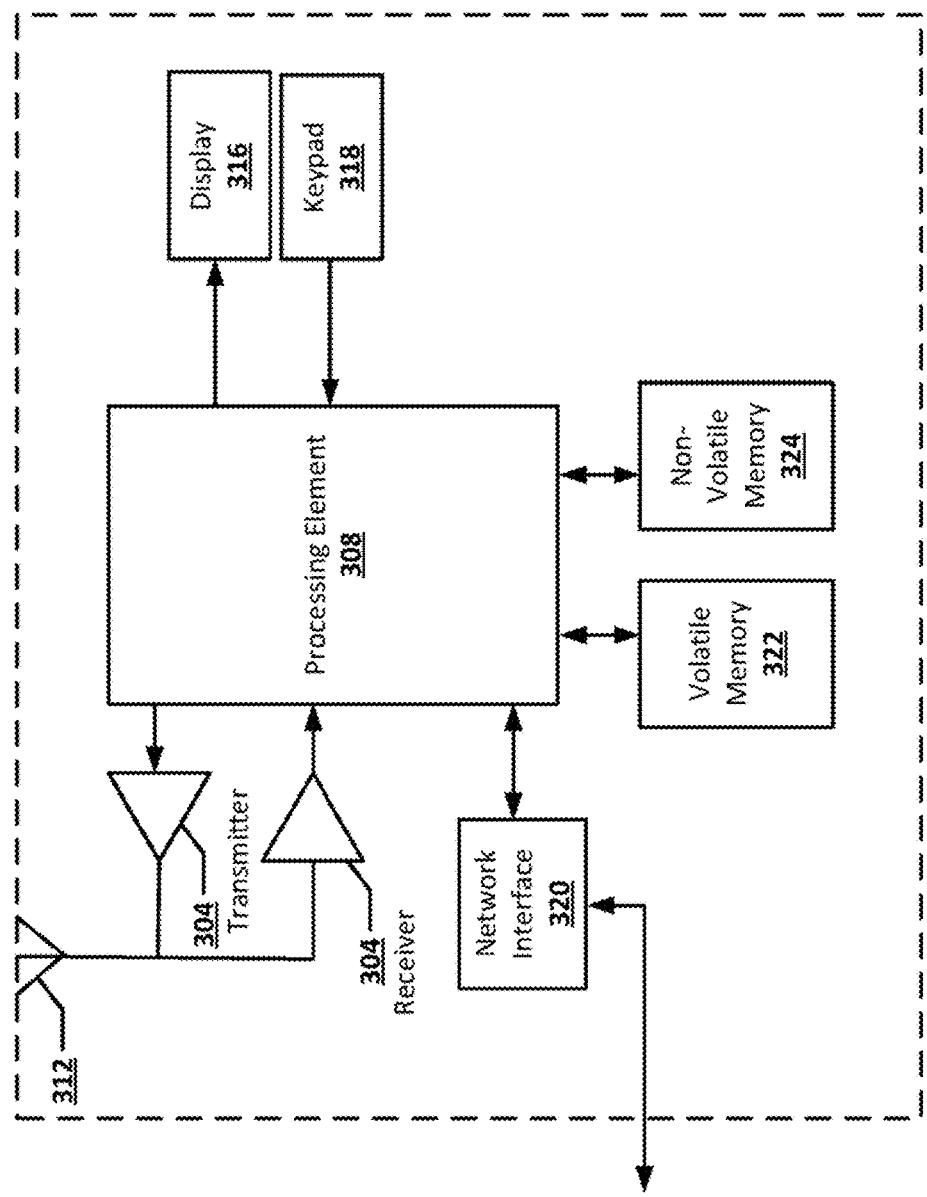

FIG. 3 provides an example external computing entity in accordance with some embodiments discussed herein.

Figure 4:
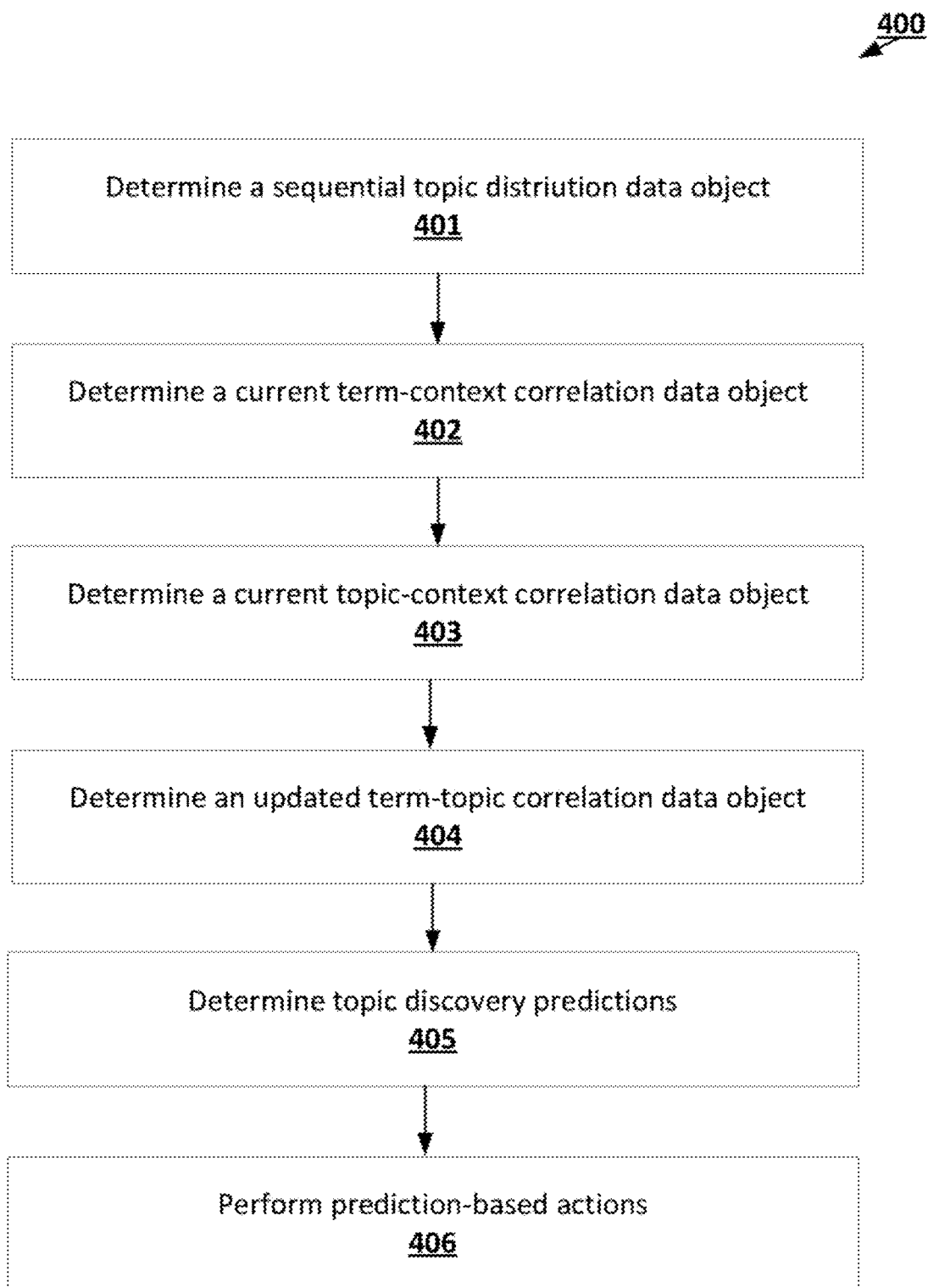

FIG. 4 is a flowchart diagram of an example process for performing sequential topic modeling in accordance with some embodiments discussed herein.

Figure 5:
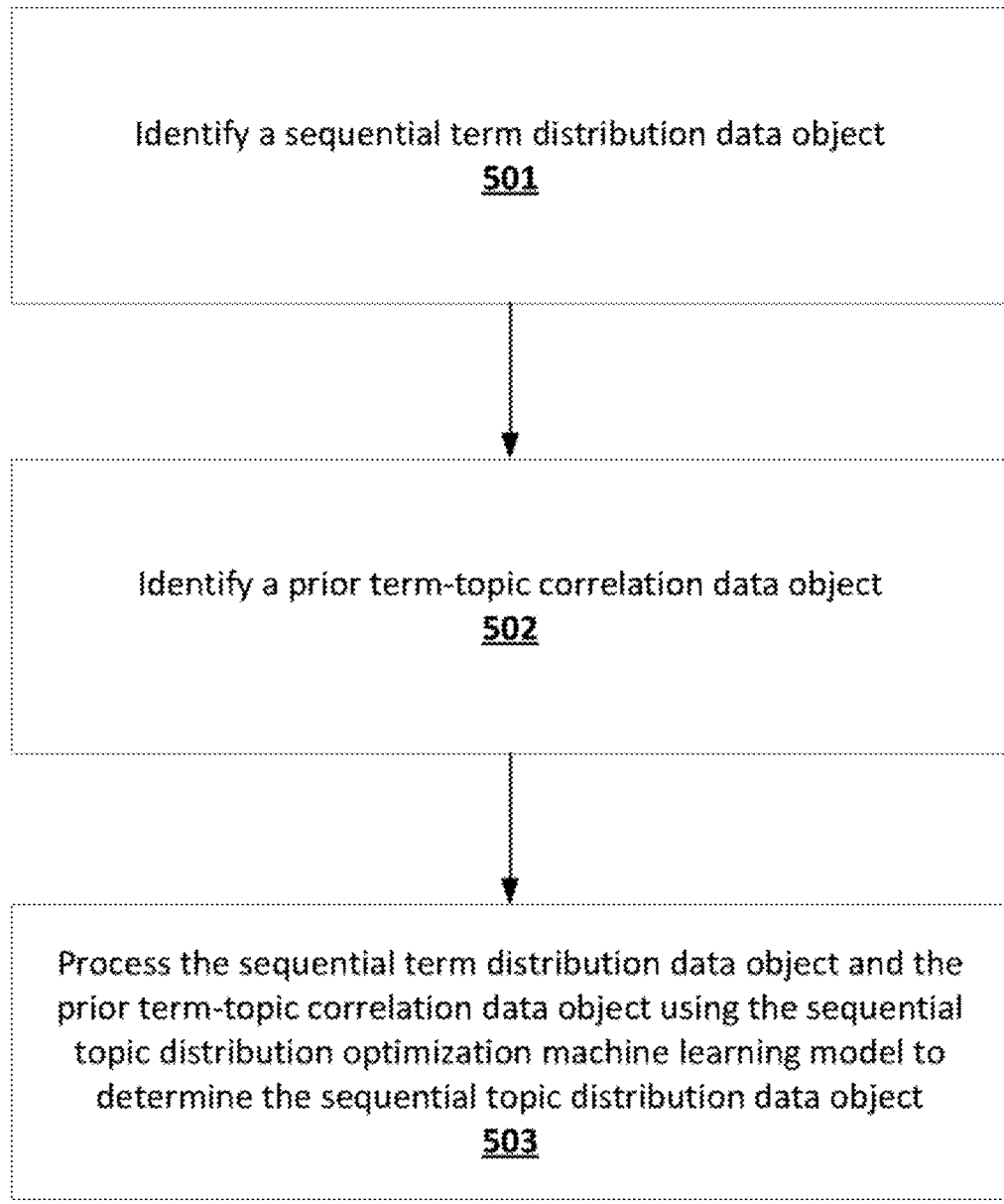

FIG. 5 is a flowchart diagram of an example process for determining a current term-context correlation data object for the current document sequence for a current document sequence in accordance with some embodiments discussed herein.

Figure 6:
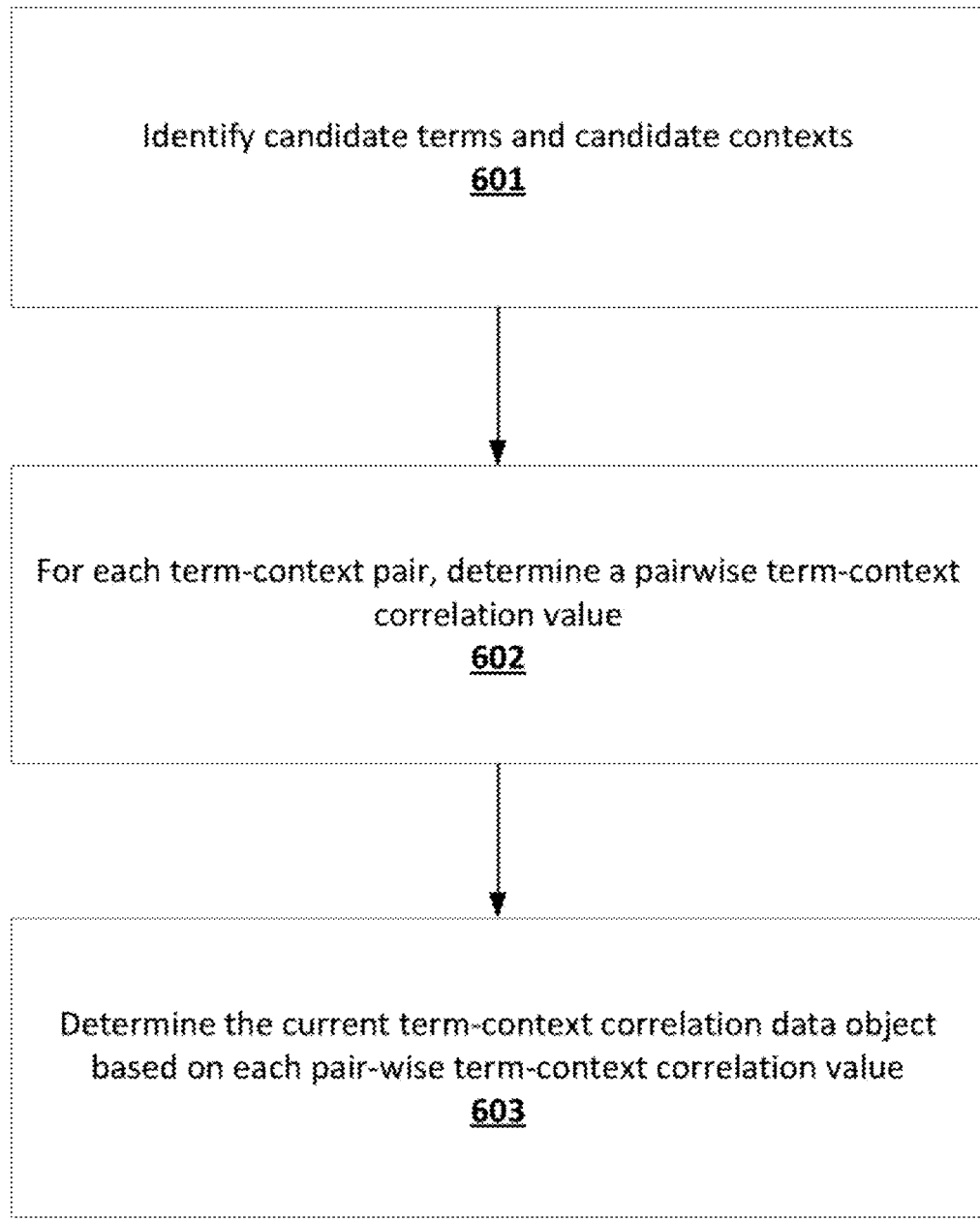

FIG. 6 is a flowchart diagram of an example process for determining a sequential topic distribution data object for a current document sequence in accordance with some embodiments discussed herein.

Figure 7:
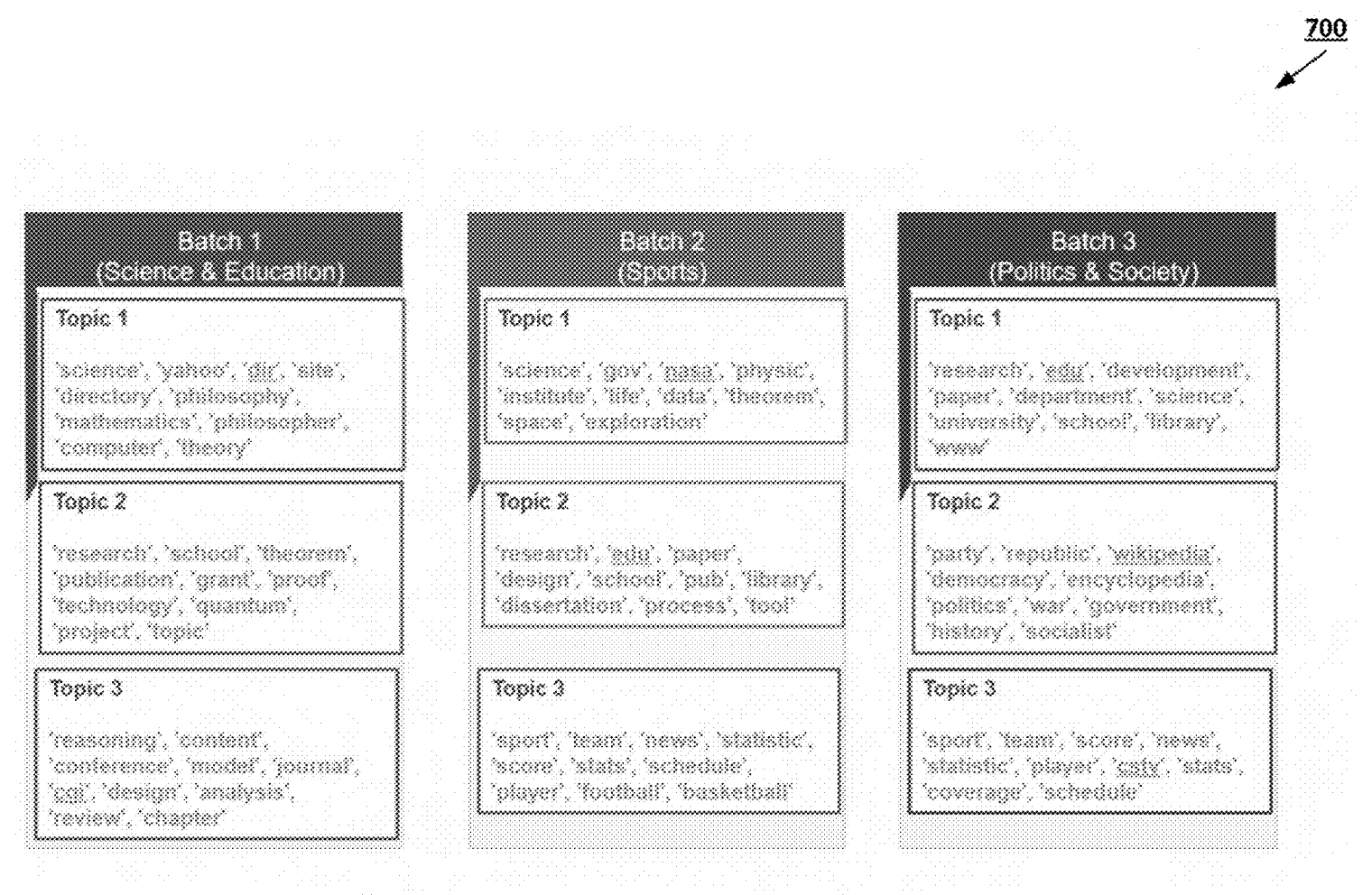

FIG. 7 provides an operational example of a prediction output user interface in accordance with some embodiments discussed herein.

Figure 8:
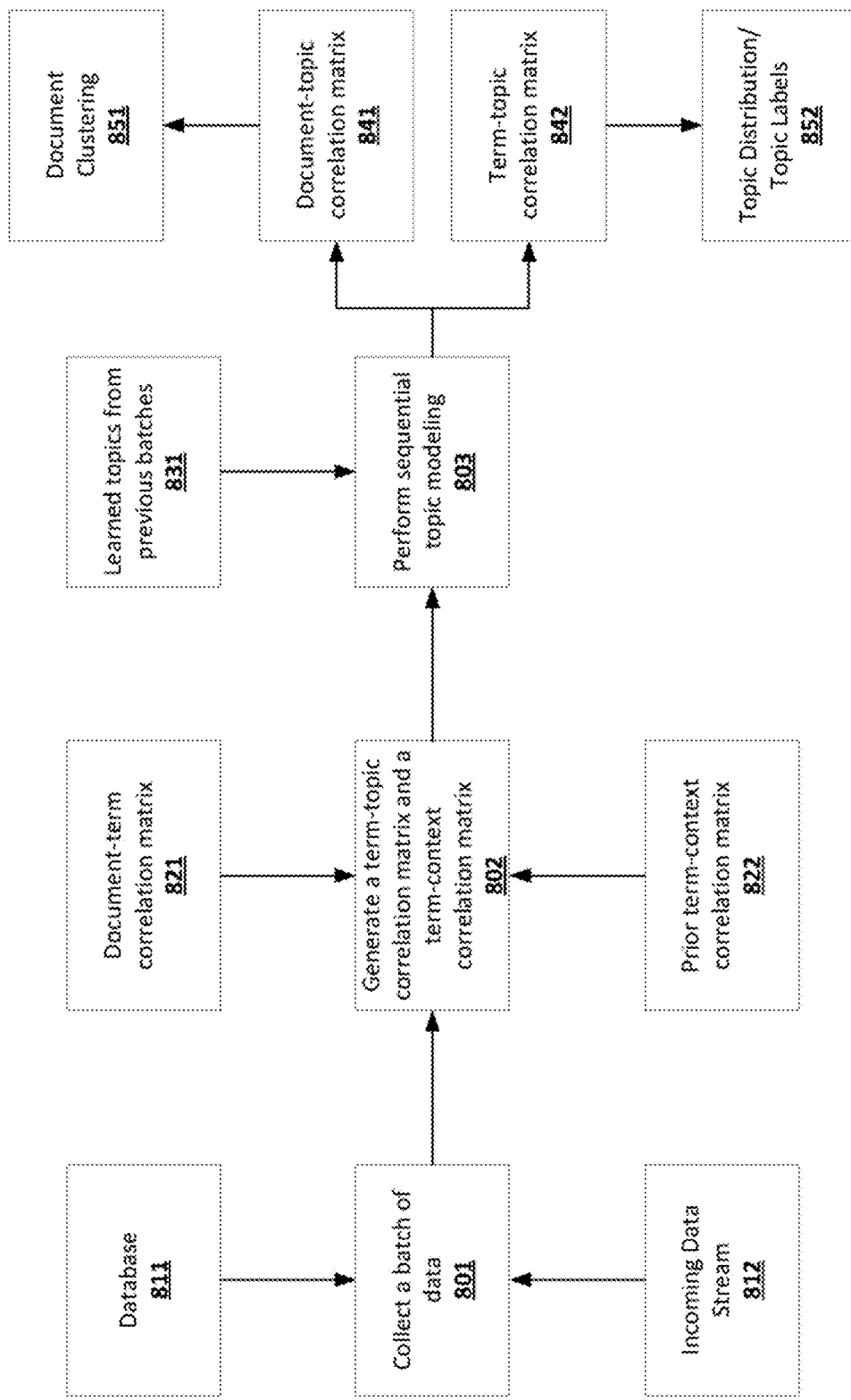

FIG. 8 provides an operational example of performing sequential topic modeling in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention introduce techniques for sequential topic modeling (e.g., online topic modeling) that enable processing a document corpus in pieces while integrating cross-document inferences across various sequential iterations. As a consequence of the disclosed techniques, the amount of text data that needs to be stored in memory at each time during topic modeling is reduced. This in turn means that topic modeling tasks can be implemented with less memory space requirements. By reducing the amount of memory space needed to perform topic modeling tasks, the noted embodiments of the present invention improve storage efficiency of performing topic modeling. In doing so, the noted embodiments of the present invention make important low-level technical contributions to reducing computational efficiency of performing topic modeling tasks.

For example, consider a text corpus that includes a total of three hundred documents, where each document is on average 100 kilobytes. Absent sequential topic modeling, the entirety of the text corpus (thus close to 300*100=30000 kilobytes) should be loaded on to the memory for a holistic processing of the text corpus as part of performing a topic modeling task with respect to the text corpus. However, by utilizing the topic modeling techniques introduced herein, a topic modeling server can load the three hundred documents individually as part of sequential batches, which means at each time around 100 kilobytes of data will be loaded on to the memory. This in turn reduces both memory requirements of the topic modeling server and the need for complex persistent memory management solutions and/or distributed memory management solutions on the topic modeling server, which in turn improves both the storage efficiency and the computational efficiency of performing topic modeling using the noted topic modeling server.

Moreover, the significant storage demand of existing online topic modeling solutions also causes problems for computational complexity of these solutions. For example, existing online topic modeling solutions that require holistic processing of text data often extract feature data about such text data using sparse matrices, which in turn increases the computational complexity of matrix processing operations performed as part of the noted existing online topic modeling solutions. By introducing techniques for sequential topic modeling, various embodiments of the present invention remove the noted challenges for the computational efficiency of various existing online topic modeling solutions that perform holistic processing of input text data, and thus in doing so improve computational efficiency of performing online topic modeling.

II. DEFINITIONS

The term "current document sequence" may refer to a data entity that is configured to describe a portion of text data associated with a document corpus, where the portion of the text data is associated with a current timestamp and is received by a predictive data analysis computing entity at the current timestep. For example, in some embodiments, the predictive data analysis computing entity may be configured to receive text data in an incremental fashion and/or in an online fashion. In some of the noted exemplary embodiments, the predictive data analysis computing entity may be configured to generate batches of newly-arrived data as current document sequences. As another example, in some embodiments, the predictive data analysis computing entity may be configured to divide a corpus of text data stored on a storage subsystem that is associated with the predictive data analysis computing entity into a group of text data portions and generate current document sequences based on an ordering of the group of text data portions. As yet another example, in some embodiments, the predictive data analysis computing entity may be configured to receive documents (e.g., short text documents, such as short-text user feedback documents) as they are submitted to a submission platform associated with the predictive data analysis computing entity. In some of the noted exemplary embodiments, the predictive data analysis computing entity may be configured to assign each received document to a corresponding current document sequence.

The term "sequential topic distribution data object" may refer to a data entity that is configured to describe each degree of association of q corresponding document sequence with a candidate topic of a group of candidate topics. For example, given a computing environment that is associated with k candidate topics (where k may be a hyper-parameter of the computing environment), the sequential topic distribution data object for a corresponding document sequence may be a vector that describes k values, where each of the k values describes an inferred degree of association of the corresponding document sequence with a candidate topic of the k candidate topics. In some embodiments, the sequential topic distribution data object is a component (e.g., a row vector or a column vector) of a document-topic correlation data object. For example, in some embodiments, given n document sequences and k candidate topics, the document-topic correlation data object may be an n×k matrix, where each sequential topic distribution data object for a document sequence of the n document sequences is a row vector of the noted n×k matrix.

The term "sequential term distribution data object" may refer to a data entity that is configured to describe each per-term frequency occurrence measure for a candidate term of a group of candidate terms within a corresponding document sequence. For example, in some embodiments, given a computing environment that is associated with m candidate terms (where m may be a hyper-parameter of the computing environment), the sequential term distribution data object for a document sequence is a vector that describes m values, where each of the m values describes the per-term occurrence frequency measure for a corresponding term within the document sequence. In some embodiments, the sequential term distribution data object is a component (e.g., a row vector or a column vector) of a document-term correlation data object. For example, in some embodiments, given n document sequences and m candidate terms, the document-term correlation data object may be an n×m matrix, where each sequential term distribution data object for a document sequence of the n document sequences is a row vector of the noted n×m matrix.

The term "sequential context distribution data object" may refer to a data entity that is configured to describe an inferred measure of association of the current document sequence with one or more candidate contexts based on a distribution of terms across the current document sequence. For example, given a computing environment that is associated with f candidate contexts (where f may be a hyperparameter of the computing environment), the sequential context distribution may include f values each of which describes an inferred measure of association between the current document sequence and a corresponding candidate context of the f candidate contexts. In some embodiments, the sequential context distribution data object is a row or column vector of a document-context correlation data object that describes inferred measures of associations of various documents across various candidate contexts.

The term "per-term occurrence frequency measure" may refer to a data entity that is configured to describe a feature related to a count of occurrence of a corresponding candidate term within a corresponding document sequence. In some embodiments, the per-term occurrence frequency measure describes the count of occurrence of a corresponding candidate term within a corresponding document sequence. For example, if the candidate term "cancer" occurs three times within a corresponding document sequence, the per-term occurrence frequency measure for the noted candidate term and the corresponding document sequence may be three. In some embodiments, the per-term occurrence frequency measure describes a measure of the relation of the frequency of occurrence of the corresponding candidate term in the corresponding document sequence and the frequency of occurrence of the corresponding candidate term in the entirety of the document corpus that includes the corresponding document sequence. For example, in some embodiments, the per-term occurrence frequency measure for a corresponding candidate term within a corresponding document sequence describes a term-frequency-inverse-domain-frequency (TF-IDF) measure of the occurrence frequency of the corresponding candidate term in the corresponding document sequence in relation to the frequency of occurrence of the corresponding candidate term in the entirety of the document corpus that includes the corresponding document sequence.

The term "sequential topic distribution optimization machine learning model" may refer to a data entity that is configured to describe trained parameters, hyper-parameters, and/or operations a machine learning model, where the machine learning model is configured to detect a sequential topic distribution data object that optimizes the model output of the sequential topic distribution optimization machine learning model. For example, the sequential topic distribution optimization machine learning model may be configured to detect a sequential term distribution data object that minimizes the model output of the sequential topic distribution machine learning model. In some embodiments, the sequential topic distribution optimization machine learning model may relate the model output of the sequential topic distribution optimization machine learning model to one or more model inputs and/or one or more learnable parameters, where the one or more model inputs of the sequential topic distribution optimization machine learning model may include the sequential term distribution data object and the prior term-topic correlation data object, and where the one or more learnable parameters of the sequential topic distribution optimization machine learning model may include the sequential topic distribution data object. In some embodiments, the sequential topic distribution optimization machine learning model is characterized by a Lasso optimization problem, such as a Lasso optimization problem that can be solved using projected gradient (PGD).

The term "current term-context correlation data object" may refer to a data entity that is configured to describe inferred measures of correlation between a group of candidate terms and a group of candidate contexts, where a context describes a grouping of the terms that may describe a context in which a term appears, and where the inferred measures of correlation are determined based on processing the sequential topic distribution data object for a corresponding current document sequence. In some embodiments, the current term-context correlation data object is a matrix, where each matrix value describes an inferred measure of correlation of a corresponding candidate term with a corresponding candidate context. In some embodiments, the current term-context correlation data object may be determined using a skip-gram view of a document corpus, for examples using the techniques described in Shi et al., *Short-Text Topic Modeling via Non-negative Matrix Factorization Enriched with Local Word-Context Correlations* (2018), available online at https://dl.acm.org/doi/10.1145/3178876.3186009. In some embodiments, the current term-context correlation data object is a data object (e.g., a matrix) that describes a pairwise term-context correlation value for each term-context pair that is associated with a candidate term and a candidate context. For example, given a computing environment that is associated with two candidate terms T1 and T2 as well as two candidate contexts C1 and C2, the current term-context correlation data object may describe: a pairwise term-context correlation value for T1 and C1, a pairwise term-context correlation value for T2 and C1, a pairwise term-context correlation value for T1 and C2, and a pairwise term-context correlation value for T2 and C2.

The term "candidate context" may refer to a data entity that describes a grouping of terms that is deemed to be semantically significant and/or semantically related. In some embodiments, the candidate contexts may be determined using a ski-gram view of a document corpus, for examples using the techniques described in Shi et al., *Short-Text Topic Modeling via Non-negative Matrix Factorization Enriched with Local Word-Context Correlations* (2018), available online at https://dl.acm.org/doi/10.1145/3178876.3186009. In some embodiments, each document corpus in a document corpus is deemed a candidate context defined by the terms used in the document corpus. This may specially be beneficial for document corpuses that comprise short document sequences, such as document corpuses that comprise short feedback documents. In some embodiments, some or all of fixed windows of neighboring words that occur in the document corpus are deemed to constitute candidate contexts. For example, given a document corpus that includes a first document that includes the words "W1 W2 W3" and a second one that includes the words "W2 W3 W4," and further given a window size of two, examples of candidate contexts may include: "W1 W2," "W2 W3," and "W3 W4."

In some embodiments, a context is generated as a long pseudo-text by aggregating short texts belonging to a term cluster, where the term cluster may be formed by mapping embedded representations (e.g., Word2Vec representations)

of terms to a multi-dimensional space and using Word Mover's Distance (WMD) between the embedded representations to determine clusters of terms.

The term "pairwise term-context correlation value" may refer to a data entity that is configured to describe an inferred likelihood that the candidate term associated with a corresponding term-context pair relates to the candidate context associated with the corresponding term-context pair. In some embodiments, the pairwise term-context correlation value for a corresponding term-context pair that is associated with a candidate term and a candidate context may be determined based on at least one of a number of times that the candidate term has been recorded to have occurred in a relevant document corpus at each time (referred to herein as the term-wise occurrence frequency of the candidate term), a number of times that the candidate context has been recorded to have occurred in a relevant document corpus at each time (referred to herein as the context-wise occurrence frequency of the candidate context), and a number of times the candidate term has been recorded to have occurred in relation to the candidate context in a relevant document corpus (referred to herein as the pair-wise occurrence frequency of the candidate term and the candidate context). In some embodiments, the pair-wise term-context correlation value for a term-context pair that is associated with the candidate term i and the candidate context j is denoted as $r_{ij}$. In some of the noted embodiments, $r_{ij}$ may be calculated by performing the operations of the equation $$r_{ij} = \max\left[\log\left(\frac{\#(t_i, c_j)}{\#(t_i)p(c_j)}\right) - \log k, 0\right],$$

where: (i) $\#(t_i, c_j)$ is the context-wise occurrence frequency for the candidate term i and the candidate context j, (ii) $\#(t_i)$ is the term-wise occurrence frequency for the candidate term i which may be determined in accordance with the operations of the equation $\#(t_i)=\Sigma_j \#(t_i, c_j)$ (where j iterates over all of the candidate contexts), (iii) k is the number of negative samples in which is the context-wise occurrence frequency for the candidate term i and the candidate context j do not occur in relation to each other, and (iv) $p(c_j)$ is the unigram distribution for sampling a context $c_j$ which may be determined in accordance with the operations of the equation $$p(c_j) = \frac{\#(c_j)}{\sum_j \#(c_j)}.$$

In the latter equation, $\#(c_j)$ is the context-wise occurrence frequency of the candidate context j which may be determined in accordance with the operations of the equation $\#(C_j)=\Sigma_i \#(t_i, c_j)$ (where i iterates over all of the candidate terms, and j in the denominator term iterates over all candidate contexts).

The term "current context-topic correlation data object" may refer to a data entity that is configured to describe inferred measures of correlation of a group of candidate contexts and a group of candidate topics, where the inferred measures of correlation are determined based on processing the current term-context correlation data object for a corresponding current document sequence. In some embodiments, the current context-topic correlation data object is a matrix, where each matrix value describes an inferred measure of correlation of a corresponding candidate context with a corresponding candidate topic. For example, given a computing environment that is associated with two topics T1 and T2 and three contexts C1, C2, and C3, the current context-topic correlation data object for a corresponding document sequence may include: a first value that describes an inferred measure of correlation of T1 and C1 that is determined based on processing the current term-context correlation data object for the corresponding current document sequence, a second value that describes an inferred measure of correlation of T1 and C2 that is determined based on processing the current term-context correlation data object for the corresponding current document sequence, a third value that describes an inferred measure of correlation of T1 and C3 that is determined based on processing the current term-context correlation data object for the corresponding current document sequence, a fourth value that describes an inferred measure of correlation of T2 and C1 that is determined based on processing the current term-context correlation data object for the corresponding current document sequence, a fifth value that describes an inferred measure of correlation of T2 and C2 that is determined based on processing the current term-context correlation data object for the corresponding current document sequence, and a sixth value that describes an inferred measure of correlation of T2 and C3 that is determined based on processing the current term-context correlation data object for the corresponding current document sequence. In some embodiments, the current context-topic correlation data object for a corresponding document sequence may be determined based on processing the current term-context correlation data object for the corresponding document sequence using a sequential context-topic correlation optimization machine learning model.

The term "sequential context-topic correlation optimization machine learning model" may refer to a data entity that is configured to describe the trained parameters, hyper-parameters, and/or operations of a machine learning model, where the machine learning model is configured to detect a current context-topic correlation data object that optimizes the model output of the context-topic correlation optimization machine learning model. For example, the sequential context-topic correlation optimization machine learning model may be a machine learning model that is configured to detect a current context-topic correlation data object that minimizes the model output of the context-topic correlation optimization machine learning model. In some embodiments, the sequential context-topic correlation optimization machine learning model may relate the model output of the sequential context-topic correlation optimization machine learning model to one or more model inputs and/or one or more learnable parameters, where the one or more model inputs of the sequential context-topic correlation optimization machine learning model may include the current term-context correlation data object for a corresponding current document sequence and the prior term-topic correlation data object, and where the one or more learnable parameters of the sequential context-topic correlation optimization machine learning model may include the current context-topic correlation data object for a corresponding current document sequence. In some embodiments, the sequential context-topic correlation optimization machine learning model may include an L2 regularization sub-model, such as an L2 regularization sub-model that is associated with the current term-context correlation data object for the corresponding current document sequence.

The term "updated term-topic correlation data object" may refer to a data entity that is configured to describe a term-topic correlation data object that is generated based on the sequential topic distribution data object for a current document sequence that is currently being processed and the current context-topic correlation data object for the current document sequence that is currently being processed. In other words, the updated term-topic correlation data object is determined based on: (i) the inferred context-topic correlation data that is determined based on the current document sequence, and (ii) the term-topic correlation data that is determined based on the current document sequence. In some embodiments, the updated term-topic correlation data object is determined using a sequential term-topic correlation optimization machine learning model.

The term "sequential term-topic correlation optimization machine learning model" may refer to a data entity that is configured to describe the trained parameters, the hyper-parameters, and/or the operations of a machine learning model, where the machine learning model is configured to detect an updated term-topic correlation data object that optimizes the model output of the term-topic correlation optimization machine learning model. For example, the sequential context-topic correlation optimization machine learning model may be a machine learning model that is configured to detect an updated term-topic correlation data object that minimizes the model output of the sequential term-topic correlation optimization machine learning model. In some embodiments, the sequential term-topic correlation optimization machine learning model may relate the model output of the sequential term-topic correlation optimization machine learning model to one or more model inputs and/or one or more learnable parameters, where the one or more model inputs of the sequential term-topic correlation optimization machine learning model may include the current context-topic correlation data object for a corresponding current document sequence, and where the one or more learnable parameters of the sequential context-topic correlation optimization machine learning model may include the updated term-topic correlation data object. In some embodiments, the sequential term-topic correlation optimization machine learning model is associated with a decay parameter. In some embodiments, minimizing the model output of the sequential term-topic correlation optimization machine learning model comprises performing a first-order projected gradient inference. In some embodiments, minimizing the model output of the sequential term-topic correlation optimization machine learning model comprises performing a second-order projected gradient inference.

The term "topic modeling prediction" may refer to a data entity that is configured to describe least one feature related to distribution of one or more topics across a document corpus including two or more document sequences. Examples of topic modeling predictions include a document-topic correlation data object and a term-topic correlation data object.

The term "document-topic correlation data object" may refer to a data entity that is configured to describe inferred measures of correlation between a group of document sequences and a group of candidate topics. For example, a document-topic correlation data object may be a matrix, where each matrix value describes the inferred measure of correlation of a corresponding document sequence and a corresponding candidate topic. The document-topic correlation data object for a batch of document sequences may be generated by combining the topic distribution data objects of the document sequences in the batch.

The term "term-topic correlation data object" may refer to a data entity that is configured to describe inferred measures of correlation between a group of candidate terms and a group of candidate topics. For example, a term-topic correlation data object may be a matrix, where each matrix value describes the inferred measures of correlation of a corresponding candidate term and a corresponding candidate topic. The term-topic correlation data object for a batch of document sequences may be generated based on the updated term-topic correlation data object generated after sequentially processing each document sequence in the batch. For example, given an ordered batch of document sequences, the term-topic correlation data object for the batch may be generated based on the updated term-topic correlation data object generated after processing the last document sequence in the batch based on the ordering of the batch.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about topics discussed in a document sequence, such as a document sequence that includes user feedback about a computing platform (e.g., a computing platform associated with a hospital institution).

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for performing sequential topic modeling. Via the various step/operations of the process 400, the predictive data analysis computing entity 106 can perform topic detection on a document corpus in sequential batches, a feature that in turn improves memory efficiency and computational efficiency of performing sequential topic modeling (e.g., online topic modeling).

The process 400 begins at step/operation 401 when the predictive data analysis computing entity 106 determines a sequential topic distribution data object for a current document sequence. In some embodiments, the predictive data analysis computing entity 106 identifies the current document sequence, identifies a prior term-topic correlation data object, determines a sequential term distribution data object for the current document sequence, and processes the sequential term distribution data object for the current document sequence and the prior term-topic correlation data object in accordance with a sequential topic distribution optimization machine learning model in order to generate the sequential topic distribution data object for the current document sequence.

In some embodiments, a current document sequence describes a portion of text data associated with a document corpus, where the portion of the text data is associated with a current timestamp and is received by a predictive data analysis computing entity at the current timestep. For example, in some embodiments, the predictive data analysis computing entity may be configured to receive text data in an incremental fashion and/or in an online fashion. In some of the noted exemplary embodiments, the predictive data analysis computing entity may be configured to generate batches of newly-arrived data as current document sequences. As another example, in some embodiments, the predictive data analysis computing entity may be configured to divide a corpus of text data stored on a storage subsystem that is associated with the predictive data analysis computing entity into a group of text data portions and generate current document sequences based on an ordering of the group of text data portions. As yet another example, in some embodiments, the predictive data analysis computing entity may be configured to receive documents (e.g., short text documents, such as short-text user feedback documents) as they are submitted to a submission platform associated with the predictive data analysis computing entity. In some of the noted exemplary embodiments, the predictive data analysis computing entity may be configured to assign each of the received documents to a corresponding current document sequence.

In some embodiments, the sequential topic distribution data object is configured to describe each degree of association of the corresponding document sequence with a candidate topic of a group of candidate topics. For example, given a computing environment that is associated with k candidate topics (where k may be a hyper-parameter of the computing environment), the sequential topic distribution data object for a corresponding document sequence may be a vector that describes k values, where each of the k values describes an inferred degree of association of the corresponding document sequence with a candidate topic of the k candidate topics. In some embodiments, the sequential topic distribution data object is a component (e.g., a row vector or a column vector) of a document-topic correlation data object. For example, in some embodiments, given n document sequences and k candidate topics, the document-topic correlation data object may be an n×k matrix, where each sequential topic distribution data object for a document sequence of the n document sequences is a row vector of the noted n×k matrix.

In some embodiments, step/operation 401 may be performed in accordance with the process depicted in FIG. 5.

The process depicted in FIG. 5 begins at step/operation 501 when the predictive data analysis computing entity 106 identifies a sequential term distribution data object for the current document sequence. In some embodiments, the sequential term distribution data object for a document sequence is configured to describe each per-term frequency occurrence measure for a candidate term of a group of candidate terms within the corresponding document sequence. For example, in some embodiments, given a computing environment that is associated with m candidate terms (where m may be a hyper-parameter of the computing environment), the sequential term distribution data object for a document sequence is a vector that describes m values, where each of the m values describes the per-term occurrence frequency measure for a corresponding term within the document sequence. In some embodiments, the sequential term distribution data object is a component (e.g., a row vector or a column vector) of a document-term correlation data object. For example, in some embodiments, given n document sequences and m candidate terms, the document-term correlation data object may be an n×m matrix, where each sequential term distribution data object for a document sequence of the n document sequences is a row vector of the noted n×m matrix.

In some embodiments, a per-term occurrence frequency measure describes a feature related to a count of occurrence of a corresponding candidate term within a corresponding document sequence. In some embodiments, the per-term occurrence frequency measure describes the count of occurrence of a corresponding candidate term within a corresponding document sequence. For example, if the candidate term "cancer" occurs three times within a corresponding document sequence, the per-term occurrence frequency measure for the noted candidate term and the corresponding document sequence may be three. In some embodiments, the per-term occurrence frequency measure describes a measure of the relation of the frequency of occurrence of the corresponding candidate term in the corresponding document sequence and the frequency of occurrence of the corresponding candidate term in the entirety of the document corpus that includes the corresponding document sequence. For example, in some embodiments, the per-term occurrence frequency measure for a corresponding candidate term within a corresponding document sequence describes a term-frequency-inverse-domain-frequency (TF-IDF) measure of the occurrence frequency of the corresponding candidate term in the corresponding document sequence in relation to the frequency of occurrence of the corresponding candidate term in the entirety of the document corpus that includes the corresponding document sequence.

At step/operation 502, the predictive data analysis computing entity 106 identifies a prior term-topic correlation data object for the document corpus that includes the current document sequence. In general, a term-topic correlation data object may describe the relationships between a group of candidate terms and a group of candidate topics. For example, given a computing environment that is associated with m candidate terms and k candidate topics (where m and/or k may be a hyper-parameter of the computing environment), the term-topic correlation data object may be an m×k matrix, where each value of the m×k matrix describes an inferred measure of correlation of a corresponding candidate term of the m candidate terms and a corresponding candidate topic of the k candidate topics. In the noted example, each row vector of the noted m×k matrix may provide a representation of a corresponding candidate term of the m candidate terms with k values, where each of the k values describes an inferred measure of correlation of the corresponding candidate term with a candidate topic of the k candidate topics. In an exemplary embodiment, given a candidate term "cancer" and given the candidate topics "medical," "sports," and "news," the row vector corresponding to the candidate term "cancer" may include three values: a first value that describes an inferred measure of correlation of the candidate term "cancer" with the candidate topic "medical," a second value that describes an inferred measure of correlation of the candidate term "cancer" with the candidate topic "sports," and a third value that describes an inferred measure of correlation of the candidate term "cancer" with the candidate topic "news."

In some embodiments, a prior term-topic correlation data object is a term-topic correlation data object that is precomputed and provided as a base measure of relationships between candidate terms and candidate topics prior to performing sequential topic modeling with respect to a current document sequence. In some embodiments, given a current document sequence that is a non-initial document sequence from an ordered batch of document sequences, the prior term-topic correlation data object may be a term-topic correlation data object generated as a result of performing sequential topic modeling with respect to a prior document sequence. For example, the prior term-topic correlation data object used for performing sequential topic modeling with respect to a nth document sequence may be the term-topic correlation data object generated as a result of term-topic correlation data object for the (n−1)th document sequence. In some embodiments, given a current document sequence that is an initial document sequence from a current ordered batch of document sequences, the prior term-topic correlation data object may be a term-topic correlation data object generated as a result of processing a prior batch of document sequences.

At step/operation 503, the predictive data analysis computing entity 106 processes the sequential term distribution data object and the prior term-topic correlation data object using a sequential topic distribution optimization machine learning model in order to generate the sequential topic distribution data object. The sequential topic distribution optimization machine learning model may be a machine learning model that is configured to detect a sequential topic distribution data object that optimizes the model output of the sequential topic distribution optimization machine learning model. For example, the sequential topic distribution optimization machine learning model may be configured to detect a sequential term distribution data object that minimizes the model output of the sequential topic distribution machine learning model. In some embodiments, the sequential topic distribution optimization machine learning model may relate the model output of the sequential topic distribution optimization machine learning model to one or more model inputs and/or one or more learnable parameters, where the one or more model inputs of the sequential topic distribution optimization machine learning model may include the sequential term distribution data object and the prior term-topic correlation data object, and where the one or more learnable parameters of the sequential topic distribution optimization machine learning model may include the sequential topic distribution data object. In some embodiments, the sequential topic distribution optimization machine learning model is characterized by a Lasso optimization problem, such as a Lasso optimization problem that can be solved using projected gradient (PGD).

In some embodiments, performing operations of the sequential topic distribution optimization machine learning model involves computing the $v^{(t)}$ value that optimizes the optimization model described by the operations of below equation:

$$\min[\tfrac{1}{2}(\|x^{(t)} - Uv^{(t)}\|_F^2 + \lambda \|v^{(t)}\|_1^2)], \text{ such that } v^{(t)} \geq 0 \text{ and } U \text{ is given} \qquad \text{Equation 1}$$

In Equation 1, t denotes an ordering identifier (e.g., a timestamp identifier when the data is processed sequentially) of the current document sequence, $x^{(t)}$ is the sequential term distribution data object for the current document sequence, $v^{(t)}$ is the sequential topic distribution data object for the current document sequence, U is the prior term-topic correlation data object (which may be $U^{t-1}$), and $\lambda$ is a preconfigured constant having the value $\lambda > 0$. In some embodiments, the optimization model of Equation 1 may be solved using PGD with the gradient computed in accordance with the operations of below equation using an appropriate update rule:

$$\frac{\partial L^{(t)}}{\partial v^{(t)}} = -(x^{(t)})^T U + (Uv^{(t)})^T U + \lambda 1_K^T \qquad \text{Equation 2}$$

In Equation 2, t denotes an ordering identifier of the current document sequence, $L^{(t)}$ is the loss measure for the current document sequence, $v^{(t)}$ is the sequential topic distribution data object for the current document sequence, U is the prior term-topic correlation data object (which may be $U^{t-1}$), and $\lambda$ is a preconfigured constant having the value $\lambda > 0$. In some embodiments, the $L^{(t)}$ measure may be calculated in accordance with the operations of the below equation:

$$L(U, V) = \|X - UV\|_F^2 = \sum_{j=1}^n \|X_j - UV_j\|_F^2 = \sum_{j=1}^n \|x_j - Uv_j\|_F^2 \qquad \text{Equation 3}$$

In Equation 3, L is a total loss measure across n document sequences, j is an index variable that iterates over document sequences, X is the term-document correlation data object, U is the term-topic correlation data object, V is the document-topic correlation data object, $X_j$ is the jth column of X, $V_j$ is the jth row of V, $x_j$ is the sequential term distribution data object for the jth document sequence, and $v_j$ is the sequential topic distribution data object for the jth document. When U is fixed, the loss measure of Equation 3 is minimized if and only if the per-document-sequence loss measure $L(U, v_j) = \|x_j - Uv_j\|_F^2$ is minimized for all j in the range $1 \leq j \leq n$. Thus, to calculate V across all document sequences, the predictive data analysis computing entity 106 may solve independent non-negative least squares problems of the form $\min_{v_j \geq 0} \|x_j - Uv_j\|_F^2$ for all j in the range $1 \leq j \leq n$ and aggregate the solution as $V = [v_1 \ldots v_n]$, where V is the document-topic correlation data object.

Returning to FIG. 4, at step/operation 402, the predictive data analysis computing entity 106 determines a current term-context correlation data object for the current document sequence. The current term-context correlation data object may describe inferred measures of correlation between a group of candidate terms and a group of candidate contexts, where a context describes a grouping of the terms that may describe a context in which a term appears, and where the inferred measures of correlation are determined based on processing the sequential topic distribution data object for a corresponding current document sequence. In some embodiments, the current term-context correlation data object is a matrix, where each matrix value describes an inferred measure of correlation of a corresponding candidate term with a corresponding candidate context. In some embodiments, the current term-context correlation data object may be determined using a skip-gram view of a document corpus, for examples using the techniques described in Shi et al., *Short-Text Topic Modeling via Non-negative Matrix Factorization Enriched with Local Word-Context Correlations* (2018), available online at https://dl.acm.org/doi/10.1145/3178876.3186009. In some embodiments, the current term-context correlation data object is a data object (e.g., a matrix) that describes a pairwise term-context correlation value for each term-context pair that is associated with a candidate term and a candidate context. For example, given a computing environment that is associated with two candidate terms T1 and T2 as well as two candidate contexts C1 and C2, the current term-context correlation data object may describe: a pairwise term-context correlation value for T1 and C1, a pairwise term-context correlation value for T2 and C1, a pairwise term-context correlation value for T1 and C2, and a pairwise term-context correlation value for T2 and C2.

In some embodiments, step/operation 402 may be performed in accordance with the process that is depicted in FIG. 6. The process that is depicted in FIG. 6 begins at step/operation 601 when the predictive data analysis computing entity 106 identifies a group of candidate terms and a group of candidate contexts. As discussed above, the candidate contexts may be determined using a ski-gram view of a document corpus, for examples using the techniques described in Shi et al., Short-Text Topic Modeling via Non-negative Matrix Factorization Enriched with Local Word-Context Correlations (2018), available online at https://dl.acm.org/doi/10.1145/3178876.3186009. In some embodiments, each document corpus in a document corpus is deemed a candidate context defined by the terms used in the document corpus. This may specially be beneficial for document corpuses that comprise short document sequences, such as document corpuses that comprise short feedback documents. In some embodiments, some or all of fixed windows of neighboring words that occur in the document corpus are deemed to constitute candidate contexts. For example, given a document corpus that includes a first document that includes the words "W1 W2 W3" and a second one that includes the words "W2 W3 W4," and further given a window size of two, examples of candidate contexts may include: "W1 W2," "W2 W3," and "W3 W4." In some embodiments, a context is generated as a long pseudo-text by aggregating short texts belonging to a document cluster, where the document cluster may be formed by adopting k-means algorithms on document under an appropriate distance metric between a pair of documents, this distance metric may be Word Mover's Distance (WMD), which can formulated using the embedded representations of words (e.g., Word2Vec representations) using the method in Shi, T., Kang, K., Choo, J., Reddy, C. K.: Short-text topic modeling via non-negative matrix factorization enriched with local word-context correlations. In: Proceedings of the World Wide Web Conference on World Wide Web, WWW'18. (2018) 1105-1114.

At step/operation 602, for each term-context pair that is associated with a candidate term of the group of candidate terms and a candidate context of the group of candidate contexts, the predictive data analysis computing entity 106 determines a pairwise term-context correlation value. The pairwise term-context correlation value for a corresponding term-context pair may describe an inferred likelihood that the candidate term associated with the corresponding term-context pair relates to the candidate context associated with the corresponding term-context pair. In some embodiments, the pairwise term-context correlation value for a corresponding term-context pair that is associated with a candidate term and a candidate context may be determined based on at least one of a number of times that the candidate term has been recorded to have occurred in a relevant document corpus at each time (referred to herein as the term-wise occurrence frequency of the candidate term), a number of times that the candidate context has been recorded to have occurred in a relevant document corpus at each time (referred to herein as the context-wise occurrence frequency of the candidate context), and a number of times the candidate term has been recorded to have occurred in relation to the candidate context in a relevant document corpus (referred to herein as the pair-wise occurrence frequency of the candidate term and the candidate context). In some embodiments, the pair-wise term-context correlation value for a term-context pair that is associated with the candidate term i and the candidate context j is denoted as $r_{ij}$. In some of the noted embodiments, $r_{ij}$ may be calculated by performing the operations of the equation $$r_{ij} = \max\left[\log\left(\frac{\#(t_i, c_j)}{\#(t_i)p(c_j)}\right) - \log k, 0\right],$$

where: (i) $\#(t_i, c_j)$ is the context-wise occurrence frequency for the candidate term i and the candidate context j, (ii) $\#(t_i)$ is the term-wise occurrence frequency for the candidate term i which may be determined in accordance with the operations of the equation $\#(t_i)=\Sigma_j \#(t_i, c_j)$ (where j iterates over all of the candidate contexts), (iii) k is the number of negative samples in which is the context-wise occurrence frequency for the candidate term i and the candidate context j do not occur in relation to each other, and (iv) $p(c_j)$ is the unigram distribution for sampling a context $c_j$ which may be determined in accordance with the operations of the equation $$p(c_j) = \frac{\#(c_j)}{\sum_j \#(c_j)}.$$

In the latter equation, $\#(c_j)$ is the context-wise occurrence frequency of the candidate context j which may be determined in accordance with the operations of the equation $\#(C_j)=\Sigma_i \#(t_i, c_j)$ (where i iterates over all of the candidate terms, and j in the denominator term iterates over all candidate contexts).

In some embodiments, to determine each pairwise term-context correlation value, the predictive data analysis computing entity 106 processes a sequential context distribution data object for the current document sequence (referred to herein as $c^{(r)}$). The sequential context distribution data object describes an inferred measure of association of the current document sequence with one or more candidate contexts based on a distribution of terms across the current document sequence. For example, given a computing environment that is associated with f candidate contexts (where f may be a hyper-parameter of the computing environment), the sequential context distribution may include f values each of which describes an inferred measure of association between the current document sequence and a corresponding candidate context of the f candidate contexts. In some embodiments, the sequential context distribution data object is a row or column vector of a document-context correlation data object that describes inferred measures of associations of various documents across various candidate contexts.

At step/operation 603, the predictive data analysis computing entity 106 determines the term-context correlation data object by combining each pair-wise term-context correlation value for a term-context pair. As described above, the pair-wise term-context correlation data object may be a matrix that describes a pairwise term-context correlation value for each term-context pair that is associated with a candidate term and a candidate context. For example, given a computing environment that is associated with two candidate terms T1 and T2 as well as two candidate contexts C1 and C2, the current term-context correlation data object may describe: a pairwise term-context correlation value for T1 and C1, a pairwise term-context correlation value for T2 and C1, a pairwise term-context correlation value for T1 and C2, and a pairwise term-context correlation value for T2 and C2.

Returning to FIG. 4, at step/operation 403, the predictive data analysis computing entity 106 determines a current context-topic correlation data object for the current document sequence. The current context-topic correlation data object may describe inferred measures of correlation of a group of candidate contexts and a group of candidate topics, where the inferred measures of correlation are determined based on processing the current term-context correlation data object for a corresponding current document sequence. In some embodiments, the current context-topic correlation data object is a matrix, where each matrix value describes an inferred measure of correlation of a corresponding candidate context with a corresponding candidate topic. For example, given a computing environment that is associated with two topics T1 and T2 and three contexts C1, C2, and C3, the current context-topic correlation data object for a corresponding document sequence may include: a first value that describes an inferred measure of correlation of T1 and C1 that is determined based on processing the current term-context correlation data object for the corresponding current document sequence, a second value that describes an inferred measure of correlation of T1 and C2 that is determined based on processing the current term-context correlation data object for the corresponding current document sequence, a third value that describes an inferred measure of correlation of T1 and C3 that is determined based on processing the current term-context correlation data object for the corresponding current document sequence, a fourth value that describes an inferred measure of correlation of T2 and C1 that is determined based on processing the current term-context correlation data object for the corresponding current document sequence, a fifth value that describes an inferred measure of correlation of T2 and C2 that is determined based on processing the current term-context correlation data object for the corresponding current document sequence, and a sixth value that describes an inferred measure of correlation of T2 and C3 that is determined based on processing the current term-context correlation data object for the corresponding current document sequence. In some embodiments, the current context-topic correlation data object for a corresponding document sequence may be determined based on processing the current term-context correlation data object for the corresponding document sequence using a sequential context-topic correlation optimization machine learning model as described below.

The sequential context-topic correlation optimization machine learning model may be a machine learning model that is configured to detect a current context-topic correlation data object that optimizes the model output of the context-topic correlation optimization machine learning model. For example, the sequential context-topic correlation optimization machine learning model may be a machine learning model that is configured to detect a current context-topic correlation data object that minimizes the model output of the context-topic correlation optimization machine learning model. In some embodiments, the sequential context-topic correlation optimization machine learning model may relate the model output of the sequential context-topic correlation optimization machine learning model to one or more model inputs and/or one or more learnable parameters, where the one or more model inputs of the sequential context-topic correlation optimization machine learning model may include the current term-context correlation data object for a corresponding current document sequence and the prior term-topic correlation data object, and where the one or more learnable parameters of the sequential context-topic correlation optimization machine learning model may include the current context-topic correlation data object for a corresponding current document sequence. In some embodiments, the sequential context-topic correlation optimization machine learning model may include an L2 regularization sub-model, such as an L2 regularization sub-model that is associated with the current term-context correlation data object for the corresponding current document sequence.

In some embodiments, performing operations of the sequential context-topic correlation optimization machine learning model involves computing the $U_c^{(t)}$ value that optimizes the optimization model described by the operations of below equation:

$$\min[\tfrac{1}{2}(\|R^{(t)}-U(U_c^{(t)})^T\|_F^2+\beta\|U_c^{(t)}\|_F^2 \text{ such that } U_c^{(t)} \geq 0$$
$$\text{and } U \text{ is given} \qquad \text{Equation 5}$$

In Equation 5, t denotes ordering an identifier of the current document sequence, $R^{(t)}$ is the current term-context correlation data object for the current document sequence, U is the prior term-topic correlation data object (which may be $U^{-1}$), $U_c^{(t)}$ is the current context-topic correlation data object for the current document sequence, $\beta$ is a preconfigured constant having the value $\beta>0$, and a denseness optimization is imposed on $U_c^{(t)}$ by using an L2 regularization term that is associated with the $U_c^{(t)}$.

At step/operation 404, the predictive data analysis computing entity 106 determines an updated term-topic correlation data object for the current document sequence. The updated term-topic correlation data object may be a term-topic correlation data object that is generated based on the sequential topic distribution data object for a current document sequence that is currently being processed and the current context-topic correlation data object for the current document sequence that is currently being processed. In other words, the updated term-topic correlation data object is determined based on: (i) the inferred context-topic correlation data that is determined based on the current document sequence, (ii) the term-topic correlation data that is determined based on the current document sequence, and (iii) updated document-topic correlation data. In some embodiments, the updated term-topic correlation data object is determined using a sequential term-topic correlation optimization machine learning model.

The sequential term-topic correlation optimization machine learning model may be a machine learning model that is configured to detect an updated term-topic correlation data object that optimizes the model output of the term-topic correlation optimization machine learning model. For example, the sequential context-topic correlation optimization machine learning model may be a machine learning model that is configured to detect an updated term-topic correlation data object that minimizes the model output of the sequential term-topic correlation optimization machine learning model. In some embodiments, the sequential term-topic correlation optimization machine learning model may relate the model output of the sequential term-topic correlation optimization machine learning model to one or more model inputs and/or one or more learnable parameters, where the one or more model inputs of the sequential term-topic correlation optimization machine learning model may include the current context-topic correlation data object for a corresponding current document sequence, and where the one or more learnable parameters of the sequential context-topic correlation optimization machine learning model may include the updated term-topic correlation data object. In some embodiments, the sequential term-topic correlation optimization machine learning model is associated with a decay parameter. In some embodiments, minimizing the model output of the sequential term-topic correlation optimization machine learning model comprises performing a first-order projected gradient inference. In some embodiments, minimizing the model output of the sequential term-topic correlation optimization machine learning model comprises performing a second-order projected gradient inference.

In some embodiments, performing operations of the sequential term-topic correlation optimization machine learning model involves computing the $U^{(t)}$ value that optimizes the optimization model described by the operations of below equation:

$$L^{(t)}(U^{(t)}) = \left[ \frac{\gamma_0}{2}\sum_{s=1}^{t}\mu\|R^{(s)} - U^{(t)}U_c^{(s)}\|_F^2 + \sum_{s=1}^{t}\frac{\gamma_s}{2}\|x^{(s)} - U^{(t)}v^{(s)}\|_F^2 \right] \qquad \text{Equation 6}$$

In Equation 6, t denotes an ordering identifier of the current document sequence, s is an index variable over document sequences that preceded the current document sequence in an ordering of a current ordered document batch associated with a current ordered document corpus, $L^{(t)}$ is the model output of the sequential term-topic correlation optimization machine learning model for the current document sequence which corresponds to a loss measure for the current document sequence, $\gamma_0$ is a base decay parameter, $\mu$ is a preconfigured constant factor, $R^{(s)}$ is the term-context correlation data object for the document sequence s, $U^{(t)}$ is the updated term-topic correlation data object for the current document sequence, $U_c^{(t)}$ is the current context-topic correlation data object data object for the current document sequence s, $\gamma_s$ is an inferred decay parameter, $x^{(s)}$ is the term distribution data object for the document sequence s, and $v^{(s)}$ is the topic distribution data object for the document sequence s.

The decay parameters of a sequential term-topic correlation optimization machine learning model may be configured to cause the sequential term-topic correlation optimization machine learning model to relatively disregard inferred data determined based on past document sequences at an exponential rate. As depicted above, the decay parameters may include a base decay parameter $\gamma_0$ and various inferred decay parameters $\gamma_s$ for s=1, 2, . . . , t (where t denotes the ordering value of the current document sequence).

In some embodiments, given an inferred decay parameter $\gamma_j$ where $j \leq 2r$ (where r may for example equal one), $\gamma_j$ may be determined in accordance with the operations of the equation $\gamma_j = \gamma_0^{(t-2r)}$ (where t is the ordering identifier for the current document sequence). In some embodiments, given an inferred decay parameter $\gamma_j$ where $t<j\leq t$ (where r may for example equal one and t is the ordering identifier for the current document sequence), $\gamma_j$ may be determined in accordance with the operations of the equation $\gamma_j = \gamma_0^{(t-j)}\gamma_f$ (where $\gamma_f$ is a preconfigured decay hyper-parameter, which may be less than one, and may for example have a value approximately equal to 0.9). In some embodiments, the base decay parameter $\gamma_0$ may have a preconfigured value, such as a value that is less than one (e.g., a value approximately equal to 0.5).

As noted above, in some embodiments, minimizing the model output of the sequential term-topic correlation optimization machine learning model comprises performing a first-order projected gradient inference. In some embodiments, performing the first-order projected gradient inference can be performed in accordance with the update procedure that corresponds to the operations of the below equation:

$$U_{k+1}^{(t)} = \rho[U_k^{(t)} + \gamma_0 \Sigma_{s=1}^{t} \mu(R^{(s)} U_c^{(s)} - U_k^{(t)} U_c^{(s)T} U_c^{(s)}) - \Sigma_{s=1}^{t} \gamma_s (x^{(s)} v^{(s)T} - U_k^{(t)} v^{(s)} v^{(s)T})] \qquad \text{Equation 7}$$

In Equation 7, $\rho[\cdot]$ denotes a projection operation, $U_k^{(t)}$ is the updated term-topic correlation optimization for a current time step, $U_{k+1}^{(t)}$ is the updated term-topic correlation data object for a prospective time step, $\gamma_0$ is a base decay parameter, s is an index variable that iterates over document sequences up to the current document sequence denoted as t, $R^{(s)}$ is the term-context correlation data object that is determined based on the document sequence s, $U_c^{(s)}$ is the context-topic correlation data object that is determined based on the document sequence s, $\gamma_s$ is the inferred decay parameter for the document sequence s, $x^{(s)}$ is the term distribution data object for the document sequence s, and $v^{(s)}$ is the topic distribution data object for the document sequence s.

As further noted above, in some embodiments, minimizing the model output of the sequential term-topic correlation optimization machine learning model comprises performing a second-order projected gradient inference. In some embodiments, performing the second-order projected gradient inference to minimize the model output of the sequential term-topic correlation optimization machine learning model comprises performing the below-depicted Algorithm 1. In some embodiments, when performing operations of Algorithm 1, $W^{(t)}$ is calculated using the Equations 8 and 9 depicted below:

$$W^{(t)} = W^{(t-1)} + \sum_{i=1}^{p}\left[\gamma_0 \cdot \mu \cdot R^{(t,i)} U_c^{(t,i)} + \gamma_t \cdot x^{(t,i)} v^{(t,i)T}\right] \qquad \text{Equation 8}$$

$$H^{(t)} = H^{(t-1)} + \sum_{i=1}^{p}\left[\gamma_0 \cdot \mu \cdot U_c^{(t,i)T} U_c^{(t,i)} + \gamma_t \cdot v^{(t,i)} v^{(t,i)T}\right] \qquad \text{Equation 9}$$

| Algorithm 1: 2nd order PGD for updating $U^{(t)}$ |
|---|
| Input : Number of topics K, Initial term-topic matrix $U_0^{(t)}$, and document-topic matrix $V^{(t)}$ and 1st order information $W^{(t)}$ |

| Algorithm 1: 2nd order PGD for updating $U^{(t)}$ |
|---|
| /* Using Conjugate Gradient Descent (CGD) */ |
| for k = 1, ..., K do |
|     Compute the gradient $\Delta_k = V^{(t)} - U_{k-1}^{(t)}$ ; |
|     Solve Q such that $QW^{(t)} = \Delta_k$ : |
|     $U_k^{(t)}$ = max $(0, Q + U_{k-1}^{(t)})$ |
| end |

Algorithm 1 can be used to perform online topic modeling in one pass using the below Algorithm 2.

| Algorithm 2: One-pass OTDA in the mini-batch model (n is the total no of data points |
|---|
| Input : Term-document matrix X, Initial term-topic matrix $U^{(0)}$, No of data points at each step = p, No of steps $S = \left\lceil \frac{n}{p} \right\rceil$ |
| Initialization: $W^{(0)} = 0$, $H^{(0)} = 0$ |
| for t = 1, ..., S do |
|    Draw $X^{(t)}$ (p data points) from from X; |
|    Compute $v^{(t)}$ by solving the optimization problem given in Eqn. |
|    Update $W^{(t)}$ and $H^{(t)}$; |
|    Update $U^{(t)}$ by Algorithm |
| end |

In some embodiments, performing the second-order projected gradient inference can be performed in accordance with the update procedure that corresponds to the operations of the below equation:

$$U_{k+1}^{(t)} = \rho[U_k^{(t)} - \nabla_{U^{(t)}}(L^{(t)}(U_k^{(t)}))H_{U^{(t)}}^{-1}(L^{(t)}(U_k^{(t)}))] \qquad \text{Equation 9}$$

In Equation 9 $\rho[\cdot]$ denotes a projection operation, $U_k^{(t)}$ is the updated term-topic correlation data object for a current time step, $U_{k+1}^{(t)}$ is the updated term-topic correlation optimization for a prospective time step, $L^{(t)}$ is the measure of loss for the current document sequence denoted as t, $H_{U^{(t)}}^{-1}$ is the inverse of the Hessian matrix of $L^{(t)}$ with respect to $U^{(t)}$, and $\nabla_{U^{(t)}}$ is the gradient of $L^{(t)}$ with respect to $U^{(t)}$.

At step/operation 405, the predictive data analysis computing entity 106 determines one or more topic modeling predictions based on the sequential topic distribution data object and the updated term-topic correlation data object. A topic modeling prediction may be any data object that describes at least one feature related to distribution of one or more topics across a document corpus including two or more document sequences. Examples of topic modeling predictions include a document-topic correlation data object and a term-topic correlation data object.

A document-topic correlation data object may describe inferred measures of correlation between a group of document sequences and a group of candidate topics. For example, a document-topic correlation data object may be a matrix, where each matrix value describes the inferred measure of correlation of a corresponding document sequence and a corresponding candidate topic. The document-topic correlation data object for a batch of document sequences may be generated by combining the topic distribution data objects of the document sequences in the batch.

A term-topic correlation data object may describe inferred measures of correlation between a group of candidate terms and a group of candidate topics. For example, a term-topic correlation data object may be a matrix, where each matrix value describes the inferred measures of correlation of a corresponding candidate term and a corresponding candidate topic. The term-topic correlation data object for a batch of document sequences may be generated based on the updated term-topic correlation data object generated after sequentially processing each document sequence in the batch. For example, given an ordered batch of document sequences, the term-topic correlation data object for the batch may be generated based on the updated term-topic correlation data object generated after processing the last document sequence in the batch based on the ordering of the batch.

At step/operation 406, the predictive data analysis computing entity 106 performs one or more prediction-based actions based on the topic modeling predictions. For example, the predictive data analysis computing entity 106 may generate a prediction output user interface that displays: (i) based on the document-topic correlation data object, the top n most relevant topics for each document in a batch of documents, and (ii) based on the term-topic correlation data object, the top m most relevant terms that relate to each topic that is deemed to be among the top n most relevant topics for at least one document in the batch. An example of such a prediction output user interface 700 is depicted in FIG. 7. As depicted in FIG. 7, each document batch is assigned three most relevant topic designations as well as the top keywords in the document batch that relate to each topic designation.

For example, as depicted in FIG. 7, the first batch is associated with a first topic that is in turn associated with the keywords "science," "yahoo," "dir," "site," "directory," "philosophy," "mathematics," "philosopher," "computer," and "theory;" a second topic that in turn associated with the keywords "research," "school," "theorem," "publication," "grant," "proof" "technology," "quantum," "project," and "topic;" and a third topic that is in turn associated with the keywords "reasoning," "content," "conference," "model," "journal," "cgi," "design," "analysis," "review," and "chapter."

As another example, as depicted in FIG. 7, the second batch is associated with a first topic that is in turn associated with the keywords "science," "gov," "nasa," "physic," "institute," "life," "data," "theorem," "space," and "exploration;" a second topic that in turn associated with the keywords "research," "edu," "paper," "design," "school," "pub," "library," "dissertation," "process," and "tool;" and a third topic that is in turn associated with the keywords "sport," "team," "news," "statistic," "score," "stats," "schedule," "player," "football," and "basketball."

As yet another example, as depicted in FIG. 7, the third batch is associated with a first topic that is in turn associated with the keywords "research," "edu," "development," "paper," "department," "science," "university," "school," "library," and "www;" a second topic that in turn associated with the keywords "party," "republic," "wikipedia," "democracy," "encyclopedia," "politics," "war," "government," "history," and "socialist;" and a third topic that is in turn associated with the keywords "sport," "team," "score," "news," "statistic," "player," "cstv," "stats," "coverage," and "schedule."

An operational example of performing the process 400 is depicted in FIG. 8. As depicted in FIG. 8, at step/operation 801, a batch of data is collected from at least one of a database 811 or an incoming data stream 812. The batch of data is an example of a current document sequence as discussed herein. As further depicted in FIG. 8, at step/operation 802, the batch of data is processed in accordance with a document-term correlation data object 821 and a prior term-context correlation matrix 822 (i.e., the term-context correlation matrix from prior batches) to generate a document term-correlation matrix and a term-context correlation matrix. Furthermore, at step/operation 803, the document-term correlation data object 821 and the prior term-context correlation matrix 822 is processed in accordance with learned topics from previous batches 831 to generate a document-topic correlation matrix 841 and a term-topic correlation matrix 842. As further depicted in FIG. 8, the document-topic correlation matrix 841 can be used to perform document clustering 851 (i.e., to cluster documents into topical clusters) and the term-topic correlation matrix 842 can be used to generate topic distributions across terms or topic labels (e.g., labels that assign particular terms to particular topics).

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for sequential topic modeling, the computer-implemented method comprising:
   determining, using one or more processors and based at least in part on a sequential term distribution data object for a current document sequence and a prior term-topic correlation data object, a sequential topic distribution data object for the current document sequence;
   determining, using the one or more processors and based at least in part on a sequential context distribution data object for the current document sequence, a current term-context correlation data object for the current document sequence;
   determining, using the one or more processors and based at least in part on the current term-context correlation data object for the current document sequence, a current context-topic correlation data object for the current document sequence;
   determining, using the one or more processors and based at least in part on the sequential topic distribution data object and the current context-topic correlation data object, an updated term-topic correlation data object;
   determining, using the one or more processors, one or more topic modeling predictions for the current document sequence based at least in part on the sequential topic distribution data object and the updated term-topic correlation data object; and
   performing, using the one or more processors, one or more prediction-based actions based at least in part on the one or more topic modeling predictions.

2. The computer-implemented method of claim 1, wherein the sequential term distribution data object is determined based at least in part on each per-term occurrence frequency for a candidate term of a plurality of candidate terms within the current document sequence.

3. The computer-implemented method of claim 1, wherein:

the prior term-topic correlation data object is determined based at least in part on a preceding term-topic correlation data object, and the preceding term-topic correlation data object is determined based at least in part on a preceding document sequence for the current document sequence.

4. The computer-implemented method of claim 1, wherein:

determining the sequential topic distribution data object for the current document sequence is determined by minimizing a model output of a sequential topic distribution optimization machine learning model that is associated with a plurality of model inputs, and the plurality of model inputs comprises the sequential term distribution data object and the prior term-topic correlation data object.

5. The computer-implemented method of claim 1, wherein determining the current term-context correlation data object comprises:

identifying a plurality of candidate terms and a plurality of candidate contexts;

for each term-context pair of a plurality of term-context pairs that is associated with a candidate term of the plurality of candidate terms and a candidate context of a plurality of candidate contexts, determining a pairwise term-context correlation value based at least in part on a term-wise occurrence frequency of the candidate term within the current document sequence, a context-wise occurrence frequency of the candidate context within the current document sequence, a pairwise occurrence frequency of the candidate term and the candidate context within the current document sequence; and determining the current term-context correlation data object based at least in part on each pairwise term-context correlation value for a term-context pair of the plurality of term-context pairs.

6. The computer-implemented method of claim 1, wherein:

determining the current context-topic correlation data object is performed by minimizing a model output of a sequential context-topic correlation optimization machine learning model that is associated with a plurality of inputs and an L2 regularization sub-model, the plurality of model inputs comprises the current term-context correlation data object and the prior term-topic correlation data object, and the L2 regularization sub-model is associated with the current term-context correlation data object.

7. The computer-implemented method of claim 1, wherein determining the updated term-topic correlation data object is performed by minimizing a model output of a sequential term-topic correlation optimization machine learning model.

8. The computer-implemented method of claim 7, wherein the sequential term-topic correlation optimization machine learning model is associated with a decay parameter.

9. The computer-implemented method of claim 7, wherein minimizing the model output of the sequential term-topic correlation optimization machine learning model comprises performing a first-order projected gradient inference.

10. The computer-implemented method of claim 7, wherein minimizing the model output of the sequential term-topic correlation optimization machine learning model comprises performing a second-order projected gradient inference.

11. The computer-implemented method of claim 1, wherein the one or more topic modeling predictions comprise a document-topic correlation data object and a term-topic correlation data object.

12. An apparatus for sequential topic modeling, the apparatus comprising at least one processor and at least one memory including program code, the at least one memory and the program code configured to, with the at least one processor, cause the apparatus to at least:

determine, based at least in part on a sequential term distribution data object for a current document sequence and a prior term-topic correlation data object, a sequential topic distribution data object for the current document sequence;

determine, based at least in part on a sequential context distribution data object for the current document sequence, a current term-context correlation data object for the current document sequence;

determine, based at least in part on the current term-context correlation data object for the current document sequence, a current context-topic correlation data object for the current document sequence;

determine, based at least in part on the sequential topic distribution data object and the current context-topic correlation data object, an updated term-topic correlation data object;

determine one or more topic modeling predictions for the current document sequence based at least in part on the sequential topic distribution data object and the updated term-topic correlation data object; and perform one or more prediction-based actions based at least in part on the one or more topic modeling predictions.

13. The apparatus of claim 12, wherein the sequential term distribution data object is determined based at least in part on each per-term occurrence frequency for a candidate term of a plurality of candidate terms within the current document sequence.

14. The apparatus of claim 12, wherein:

the prior term-topic correlation data object is determined based at least in part on a preceding term-topic correlation data object, and the preceding term-topic correlation data object is determined based at least in part on a preceding document sequence for the current document sequence.

15. The apparatus of claim 12, wherein:

determining the sequential topic distribution data object for the current document sequence is determined by minimizing a model output of a sequential topic distribution optimization machine learning model that is associated with a plurality of model inputs, and the plurality of model inputs comprises the sequential term distribution data object and the prior term-topic correlation data object.

16. The apparatus of claim 12, wherein determining the current term-context correlation data object comprises:

identifying a plurality of candidate terms and a plurality of candidate contexts;

for each term-context pair of a plurality of term-context pairs that is associated with a candidate term of the plurality of candidate terms and a candidate context of a plurality of candidate contexts, determining a pairwise term-context correlation value based at least in part on a term-wise occurrence frequency of the candidate term within the current document sequence, a context-wise occurrence frequency of the candidate context within the current document sequence, a pairwise occurrence frequency of the candidate term and the candidate context within the current document sequence; and determining the current term-context correlation data object based at least in part on each pairwise term-context correlation value for a term-context pair of the plurality of term-context pairs.

17. A computer program product for sequential topic modeling, the computer program product comprising at least one non-transitory computer-readable storage medium having computer-readable program code portions stored therein, the computer-readable program code portions configured to:

determine, based at least in part on a sequential term distribution data object for a current document sequence and a prior term-topic correlation data object, a sequential topic distribution data object for the current document sequence;

determine, based at least in part on a sequential context distribution data object for the current document sequence, a current term-context correlation data object for the current document sequence;

determine, based at least in part on the current term-context correlation data object for the current document sequence, a current context-topic correlation data object for the current document sequence;

determine, based at least in part on the sequential topic distribution data object and the current context-topic correlation data object, an updated term-topic correlation data object;

determine one or more topic modeling predictions for the current document sequence based at least in part on the sequential topic distribution data object and the updated term-topic correlation data object; and perform one or more prediction-based actions based at least in part on the one or more topic modeling predictions.

18. The computer program product of claim 17, wherein the sequential term distribution data object is determined based at least in part on each per-term occurrence frequency for a candidate term of a plurality of candidate terms within the current document sequence.

19. The computer program product of claim 17, wherein:

the prior term-topic correlation data object is determined based at least in part on a preceding term-topic correlation data object, and the preceding term-topic correlation data object is determined based at least in part on a preceding document sequence for the current document sequence.

20. The computer program product of claim 17, wherein:

determining the sequential topic distribution data object for the current document sequence is determined by minimizing a model output of a sequential topic distribution optimization machine learning model that is associated with a plurality of model inputs, and the plurality of model inputs comprises the sequential term distribution data object and the prior term-topic correlation data object.

* * * * *